(12) United States Patent
Tobita

(10) Patent No.: US 9,084,023 B2
(45) Date of Patent: Jul. 14, 2015

(54) IMAGE PROCESSING DEVICE, IMAGE PROCESSING METHOD AND IMAGE PROCESSING PROGRAM

(75) Inventor: Hiroaki Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 13/074,524

(22) Filed: Mar. 29, 2011

(65) Prior Publication Data

US 2012/0014619 A1    Jan. 19, 2012

(30) Foreign Application Priority Data

Apr. 5, 2010 (JP) ................. P2010-087140

(51) Int. Cl.
| | |
|---|---|
| G11B 27/34 | (2006.01) |
| H04N 21/482 | (2011.01) |
| G11B 27/034 | (2006.01) |
| G11B 27/10 | (2006.01) |
| H04N 5/783 | (2006.01) |
| H04N 9/82 | (2006.01) |
| H04N 21/431 | (2011.01) |
| H04N 21/4402 | (2011.01) |
| H04N 21/472 | (2011.01) |

(52) U.S. Cl.
CPC ............ *H04N 21/482* (2013.01); *G11B 27/034* (2013.01); *G11B 27/105* (2013.01); *G11B 27/34* (2013.01); *H04N 5/783* (2013.01); *H04N 9/8227* (2013.01); *H04N 21/4314* (2013.01); *H04N 21/440263* (2013.01); *H04N 21/47205* (2013.01)

(58) Field of Classification Search
USPC .................................. 715/716; 382/276, 286
See application file for complete search history.

(56) References Cited

U.S. PATENT DOCUMENTS

| 3,723,644 | A  | * | 3/1973  | Haskell et al. ................ 386/328 |
| 5,359,365 | A  | * | 10/1994 | Enokida ..................... 348/390.1 |
| 5,666,555 | A  | * | 9/1997  | Okazaki et al. ............... 715/203 |
| 5,732,146 | A  | * | 3/1998  | Yamada et al. ............... 382/107 |
| 5,748,199 | A  | * | 5/1998  | Palm ............................ 345/473 |
| 5,995,707 | A  | * | 11/1999 | Lee .............................. 386/314 |
| 6,374,260 | B1 | * | 4/2002  | Hoffert et al. ........................ 1/1 |
| 6,400,378 | B1 | * | 6/2002  | Snook .......................... 715/716 |
| 6,449,608 | B1 | * | 9/2002  | Morita et al. ................. 386/278 |
| 6,714,216 | B2 | * | 3/2004  | Abe .............................. 715/723 |
| 6,735,374 | B1 | * | 5/2004  | Hashimoto ................... 386/241 |
| 6,912,327 | B1 | * | 6/2005  | Hori et al. .................... 382/305 |
| 7,103,840 | B2 | * | 9/2006  | Ihara et al. ................... 715/726 |
| 7,159,175 | B2 | * | 1/2007  | Ishii et al. .................... 715/716 |
| 7,436,741 | B2 | * | 10/2008 | Nagai et al. ................. 369/47.32 |
| 8,458,594 | B2 | * | 6/2013  | Namai et al. ................. 715/717 |
| 8,577,200 | B2 | * | 11/2013 | Nashida et al. .............. 386/200 |
| 2002/0154156 | A1 | * | 10/2002 | Moriwake et al. ............ 345/716 |
| 2003/0227551 | A1 | * | 12/2003 | Kudo ....................... 348/207.99 |

(Continued)

FOREIGN PATENT DOCUMENTS

JP      2004-319077      11/2004

*Primary Examiner* — Phenuel Salomon
(74) *Attorney, Agent, or Firm* — Sony Corporation

(57) ABSTRACT

An image processing device is provided where it is possible to determine a reproduction form of preview moving images in an expression form which does not currently exist which is determining the reproduction form of the preview moving images using a comic which are elements of the base moving images in two dimensions by arranges panel images of base moving images in a comic region and determining the reproduction form of the preview moving images according to the comic panels arranged in the comic region, and it is possible to impress expressiveness.

18 Claims, 18 Drawing Sheets

(56) References Cited

U.S. PATENT DOCUMENTS

| | | | |
|---|---|---|---|
| 2005/0053364 A1* | 3/2005 | Nagai | 386/125 |
| 2005/0193343 A1* | 9/2005 | Kawabe et al. | 715/716 |
| 2005/0225659 A1* | 10/2005 | Kazami | 348/333.12 |
| 2008/0235010 A1* | 9/2008 | Takahashi et al. | 704/224 |
| 2009/0244306 A1* | 10/2009 | Saito | 348/220.1 |

\* cited by examiner

FIG. 5

FMI

- Class Manga Frame {
    - int page ;              // COMIC PAGE NUMBER
    - int time ;              // PANEL REPRODUCTION TIME
    - float size ;            // PANEL SIZE
    - float x ;               // PANEL X COORDINATES
    - float y ;               // PANEL Y COORDINATES
    - Bitmap Data bmp ;       // PANEL IMAGE DATA
    - Bitmap Data effect [ ] ; // EFFECT IMAGE DATA
    - Speech Bubble bubble [ ] ; // SPEECH BUBBLE SETTING
- } ;
- Class Speech Bubble {
    - Bitmap Data bmp ;       // SPEECH BUBBLE IMAGE DATA
    - String text [ ] ;       // CHARACTER ROW IN SPEECH BUBBLE
- } ;

IMAGE PROCESSING DEVICE, IMAGE PROCESSING METHOD AND IMAGE PROCESSING PROGRAM

BACKGROUND OF THE INVENTION

1. Field of the Invention

The present invention relates to an image processing device, an image processing method and an image processing program, and, for example, is appropriate to be applied to cases of forming a comic from moving images or playing back moving images based on a comic using a personal computer.

2. Description of the Related Art

In the past, as a device for changing the reproduction form of moving images, for example, a device is proposed (for example, Japanese Unexamined Patent Application Publication No. 2004-319077) which displays a bar for changing a reproduction speed on a screen and changes the reproduction speed of the moving images due to a user operating the bar.

SUMMARY OF THE INVENTION

However, in the device described above, it is possible to arbitrarily change the reproduction speed of the moving images and the like, but the operation is complicated and the screen during editing is poor in terms of expressiveness, and a device is desired which further improves the expressiveness and which is able to be simply used even by a user who is not accustomed to editing moving images.

It is desirable to provide an image processing device, an image processing method and an image processing program which are able to improve expressiveness.

According to an embodiment of the invention, an image processing device has a display control section which displays a region, where panel images which configure moving images are arranged, in a display section and a determination section which determines a reproduction form of the moving images according to the panel images of the moving images arranged in the region.

According to another embodiment of the invention, an image processing method has the steps of displaying a region, where panel images which configure moving images are arranged, in a display section and determining a reproduction form of the moving images according to the panel images of the moving images arranged in the region.

According to still another embodiment of the invention, an image processing program executes, with regard to a computer, the steps of displaying a region, where panel images which configure moving images are arranged, in a display section and determining a reproduction form of the moving images according to the panel image of the moving images arranged in the region.

According to this, by arbitrarily arranging the panel images of the moving images in the region as elements of the moving images, the region determines the reproduction form of the moving images, and it is possible to change the reproduction form of the moving images based on the region and perform reproduction.

According to the embodiments of the invention above, by arbitrarily arranging the panel images of the moving images in the region as elements of the moving images, the region determines the reproduction form of the moving images, it is possible to change the reproduction form of the moving images based on the region and perform reproduction, and it is possible to improve expressiveness of the moving images.

BRIEF DESCRIPTION OF THE DRAWINGS

FIG. 5 is an approximate diagram illustrating comic panel information.

DESCRIPTION OF THE PREFERRED EMBODIMENTS

Below, an embodiment of the invention will be described. In addition, the description will be performed in the order below.

1. Embodiment of the invention
2. Other Embodiments of the invention

1. Embodiment of the Invention

1. Configuration of Image Processing Device

Figure 1:
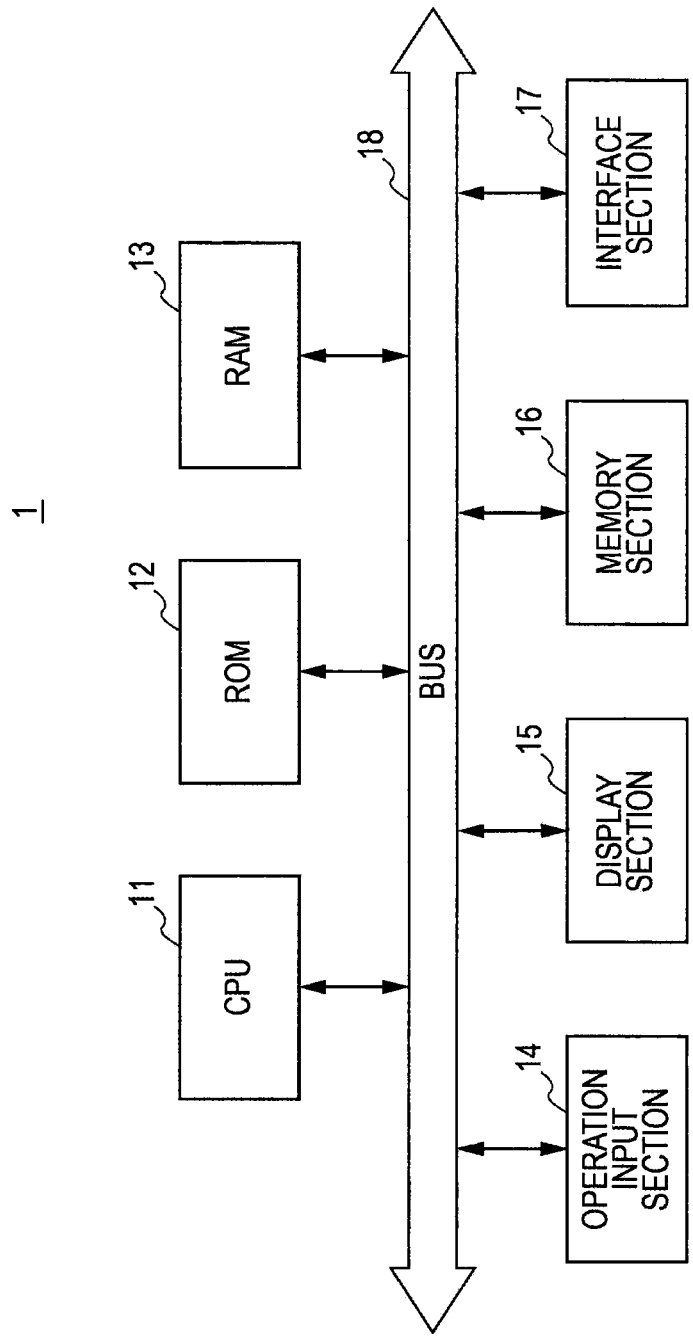
FIG. 1 is an approximate diagram illustrating an image processing device.

In FIG. 1, an image processing device 1 according to the embodiment is shown. In the image processing device 1, a CPU (Central Processing Unit) 11, a ROM (Read Only Memory) 12, a RAM (Random Access Memory) 13, an operation input section 14, a display section 15, a memory section 16, and an interface section 17 are connected via a bus 18.

The CPU 11 performs overall integrated control by developing basic programs, which are stored in the ROM 12, in the RAM 13 which functions as a work memory and executing the basic programs. Additionally, the CPU 11 executes each type of program by developing application programs, which are stored in the ROM 12 or the memory section 16, in the RAM 13 and executing the application programs.

As the operation input section 14, a mouse, a keyboard, a touch panel, or the like is applicable. Here, in the embodiment, mainly a case is described where a mouse or a keyboard is applied.

As the display section 15, a liquid crystal display, an organic EL (Electro-Luminescence) display, a cathode-ray tube display, or the like is applicable. As the memory section 16, a magnetic disc, a flash memory, or the like is applicable.

As the interface section 17, for example, an interface such as a USB (Universal Serial Bus) is applicable, and the interface section 17 is connected to a USB memory, a printer, or the like. In addition, as the interface section 17, a network interface such as a wired LAN (Local Area Network), a wireless LAN such as IEEE (Institute of Electrical and Electronics Engineers) 802.11a/b/g/n, or the like is applicable. The interface section 17 sends and receives various information to and from an external device via a network such as the internet by wired or wireless communication.

2. Image Processing

Figure 2:
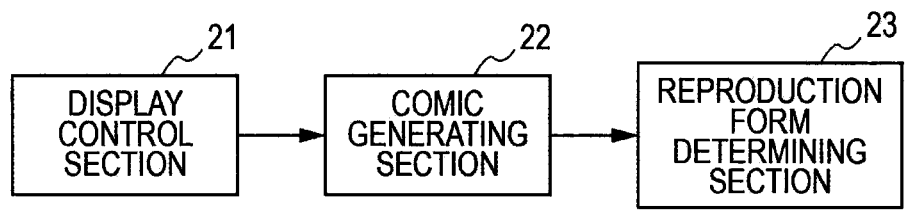
FIG. 2 is an approximate diagram illustrating a functional configuration of a CPU.

The CPU 11 executes image processing which mainly includes a comic generating process and a preview moving-image reproduction process by developing an image processing program, which is stored in the ROM 12 or the memory section 16, in the RAM 13 and executing the image processing program. When executing image processing, the CPU 11 functions as a display control section 21, a comic generating section 22, and a reproduction form determining section 23 as shown in FIG. 2.

Figure 3:
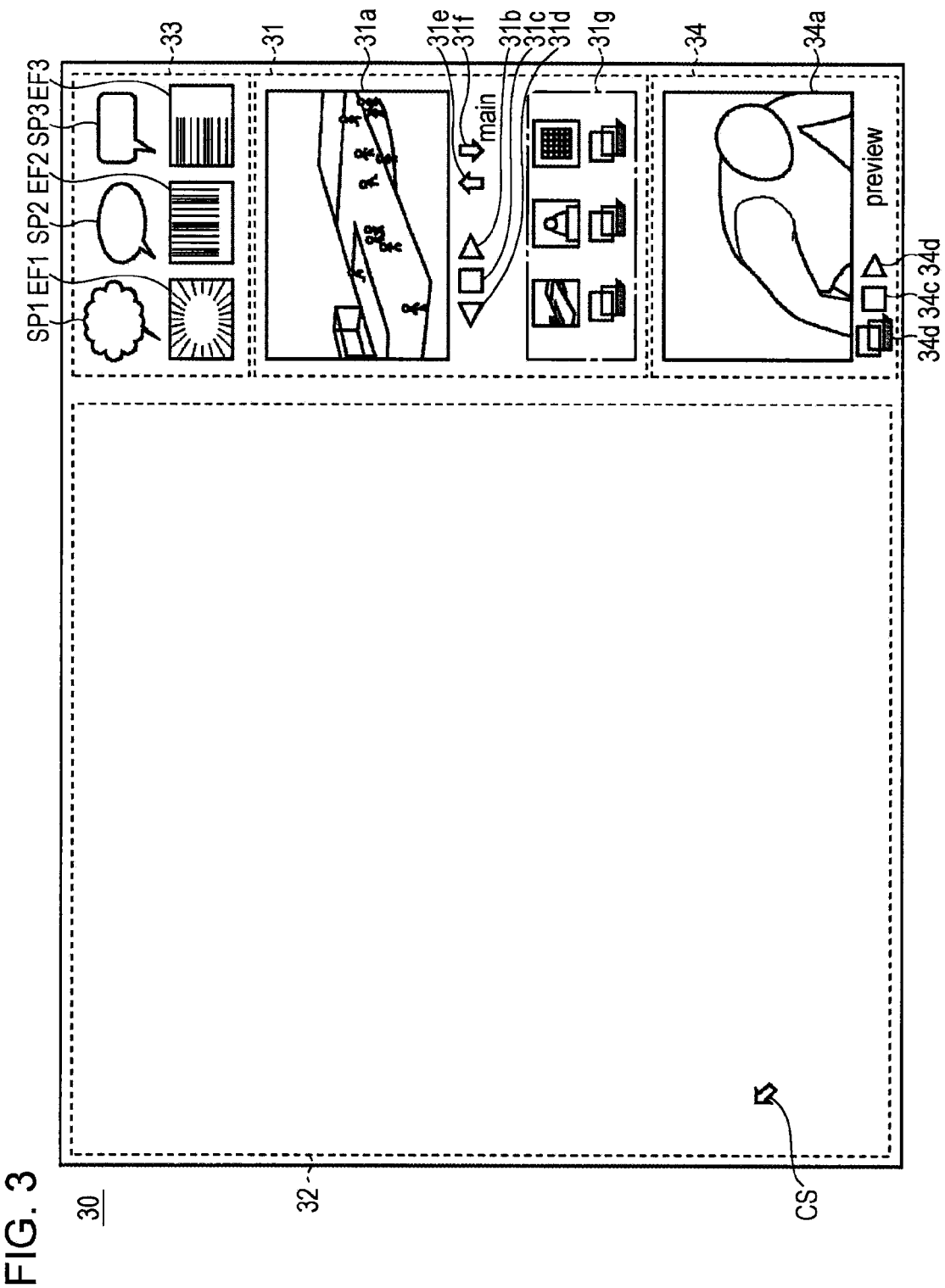
FIG. 3 is an approximate diagram illustrating a configuration (1) of an image processing screen.

When executing image processing, the display control section 21 displays an image processing screen 30 on the display section 15 as shown in FIG. 3. The image processing screen 30 includes a base moving-image reproduction instructing region 31, a comic region 32, an item display region 33, and a preview moving-image reproduction instructing region 34.

Additionally, the display control section 21 is set to receive user operations by displaying a cursor CS as a operation element, which is able to be moved on the image processing screen 30 according to, for example a mouse operation of, the operation input section 14, with the image processing screen 30.

In the base moving-image reproduction instructing region 31, a moving-image display window 31a which displays moving images which are an editing target (referred to below as base moving images), and a reproduction button 31b, a stop button 31c, and a rewind button 31d for playing back, stopping, and rewinding the base moving images displayed in the moving-image display window 31a, are provided.

Additionally, in the base moving-image reproduction instructing region 31, a candidate display region 31g which displays a plurality of candidates of base moving images, and an up button 31e and a down button 31f for selecting the base moving images displayed in the moving-image display window 31a from the moving images displayed in the candidate display region 31g.

The comic region 32 is a region where a panel image FM, which configures the base moving images displayed in the moving-image display window 31a, is arranged with an arbitrary size and positioning as a comic panel MFM (for example, FIG. 10) and is printed out as a comic.

Additionally, the comic region 32 also functions as a region where the reproduction form of the moving images, where the reproduction form of the base image has been changed (referred to below as preview moving images), is shown, as will be described in detail later. For example, an order of reading the arranged comic panels MFM which are read as a comic by a reader shows the reproduction time axis of the preview moving images and the size of the comic panels MFM shows the reproduction speed of the preview moving images.

Here, as the order of reading the comic panels MFM as a comic, for example, the comic panel MFM arranged most to the upper right of the comic region 32 is first and is continued in order by the comic panels MFM arranged in the left direction from that comic panel MFM. Then, next after all of the comic panel MFMs in the same row as the first comic panel MFM, the comic panel MFM arranged at the right end of the row below that row is next and is continued next in order in the left direction from that comic panel MFM. The reading order continues in order from the right end of the top row to the left end and is continued next in order from the right end to the left end of the row one below that row.

Additionally, in a case where a plurality of comic panels are lined up and arranged on the right side of one comic panel MFM in a lengthwise direction, the reading order is an order from the top of the plurality of comic panels MFM arranged in the lengthwise direction, and after that, is continued by the comic panel MFM arranged on the left side.

Additionally, in a case where a plurality of comic panels are lined up and arranged on the left side of one comic panel MFM in a lengthwise direction, the reading order is the comic panel MFM arranged on the right side is first and is continued in order from the top of the plurality of comic panels MFM arranged in the lengthwise direction.

In this manner, the reading order of the comic panels MFM is determined based on the position and the size of the comic panels MFM arranged in the comic region 32.

In the item display region 33, speech bubbles SP (SP1 to SP3), which are bubbles for displaying captions or comments by the writer in text, are arranged with regard to the comic panels MFM arranged in the comic region 32. Additionally, in the item display region 33, effects EF (EF1 to EF3), which are effect lines for concentrating the gaze of a reader at one point or for providing the effect of speed, are arranged. In addition, a case where there are three types each of the speech bubbles SP and the effects EF will be described, but the number may be appropriately set.

The preview moving-image reproduction instructing region 34 is provided with a preview moving-image display window 34a which displays the preview moving images, and a reproduction button 34b and a stop button 34c for playing back and stopping the preview moving images displayed in the preview moving-image display window 34a.

Additionally, the preview moving-image reproduction instructing region 34 is provided with a save button 34d for storing the preview moving images displayed in the preview moving-image display window 34a as data with a predetermined form of formatting.

[2-1. Comic Generating Process]

When, for example, out of the moving image data stored in the memory section 16, the moving image data selected by a user via an operation of the operation input section 14 is read out, the moving images are determined by display control section 21 to be the base moving images. Then, the display control section 21 displays the panel image of the first panel of the base moving images in the moving-image display window 31a.

Additionally, the display control section 21 displays the panel image of the first panel of the base moving images also in a candidate display region 31g. Furthermore, when the moving image data selected as a candidate by a user via an operation of the operation input section 14 is read out, the display control section 21 displays the panel image of the first panel of the base moving images in the candidate display region 31g.

In addition, it is possible for the display control section 21 to select data other than the moving images stored in the memory section 16 such as moving image data stored in a different external device connected via the interface section 17. Furthermore, it is possible to even select moving image data stored in a recording medium such as a USB memory or an externally attached HDD connected via the interface section 17.

In a case where the up button 31e or the down button 31f are, for example, click-operated via the cursor CS, the moving images, which correspond to another panel image out of the panel images displayed in the candidate display region 31g, are determined by the display control section 21 to be the base moving images.

For example, in a case where the up button 31e is click-operated, the moving images, which correspond to the panel image displayed on the left side of the panel image of the moving images which were determined to be the base moving images before the click-operation, are determined by the display control section 21 to be the base moving images. Then, the display control section 21 displays the panel image of the determined base moving images in the moving-image display window 31a.

In a case where the reproduction button 31b is click-operated via the cursor CS, the display control section 21 performs normal reproduction of the base moving images, which correspond to the panel image currently displayed in the moving-image display window 31a, in the moving-image display window 31a.

In addition, in a case where the rewind button 31d is click-operated via the cursor CS, the display control section 21 performs reverse reproduction of the base moving images, which correspond to the panel image currently displayed in the moving-image display window 31a, in the moving-image display window 31a.

In a case where the stop button 31c is click-operated in a state where normal reproduction or reverse reproduction of the base moving images is being performed in the moving-image display window 31a, the display control section 21 stops normal reproduction or reverse reproduction of the base moving images. Then the display control section 21 displays the panel image, which is displayed in the moving-image display window 31a at the point in time when the stop button 31c was click-operated, in that state.

Figure 4:
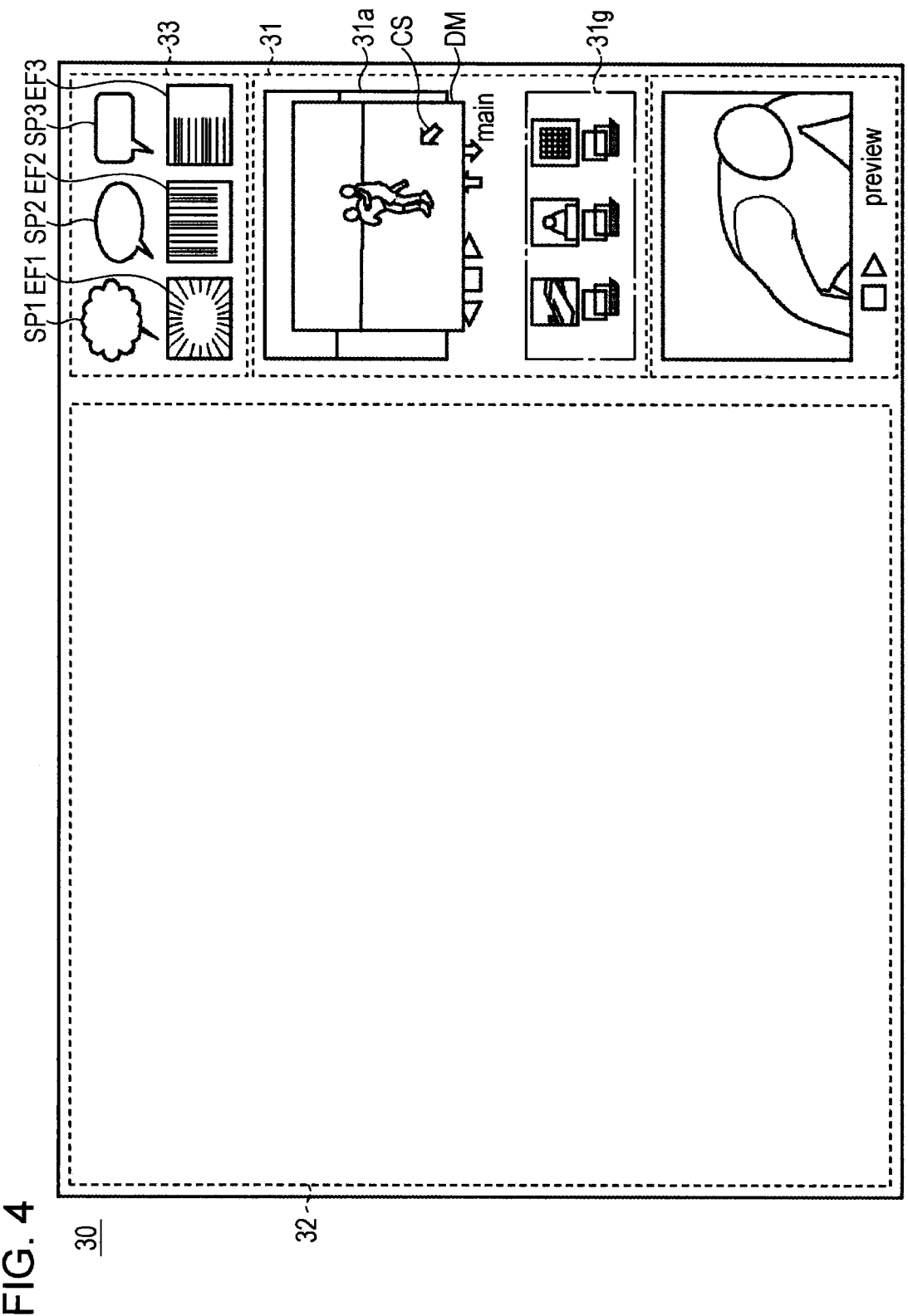
FIG. 4 is an approximate diagram illustrating a configuration (2) of the image processing screen.

When an operation of continual pressing of a mouse button (press operation) is performed in a state where the cursor CS is positioned within the moving-image display window 31a, the display control section 21 generates a duplicate image DM as shown in FIG. 4, and overlaps and displays the duplicate image DM in the moving-image display window 31a.

The duplicate image DM is shrunk to a size which is standard when the panel image, which is displayed in the moving-image display window 31a at the point in time when the mouse button was press-operated, is arranged in the comic region 32.

On the other hand, when a press operation is performed on the moving-image display window 31a, the comic generating section 22 generates a comic panel information FMI which shows information when the panel images which configure the base moving images are arranged in the comic region 32 as the comic panels MFM as shown in FIG. 5.

The comic panel information FMI shows a comic page number, a panel reproduction time, a panel size, panel X coordinates and Y coordinates, panel image data, effect image data, and speech bubble setting when the panel images which configure the base moving images are arranged in the comic region 32 as the comic panels MFM. The speech bubble setting corresponds to and shows speech bubble image data and character row input into the speech bubble.

In addition, the panel reproduction time shows the time when the panel images, which are arranged as the comic panels MFM of the base moving images displayed in the moving-image display window 31a, are reproduced in the base moving images. Additionally, the panel X coordinates and the Y coordinates show the X coordinates and the Y coordinates of the upper right corner of the comic panel based on, for example, the right top of the comic region 32.

The comic panel information FMI is generated for each of the comic panels MFM arranged in the comic region 32, and the comic panel information FMI of all of the comic panels MFM arranged in the comic region 32 is stored in the memory section 16 as a comic panel information list.

When generating the comic panel information FMI, the comic generating section 22 inputs the panel reproduction time, the panel image data, and the panel size with regard to panel images displayed in the moving-image display window 31a at the point in time when the mouse button is press-operated. Here, as the panel size, the panel size is input with the size of the duplicate image DM as the standard.

When a moving operation is performed in a state where the mouse button is being press operated (drag operation), the display control section 21 moves and displays the cursor CS and the duplicate image DM according to the movement of the drag operation.

Figure 6:
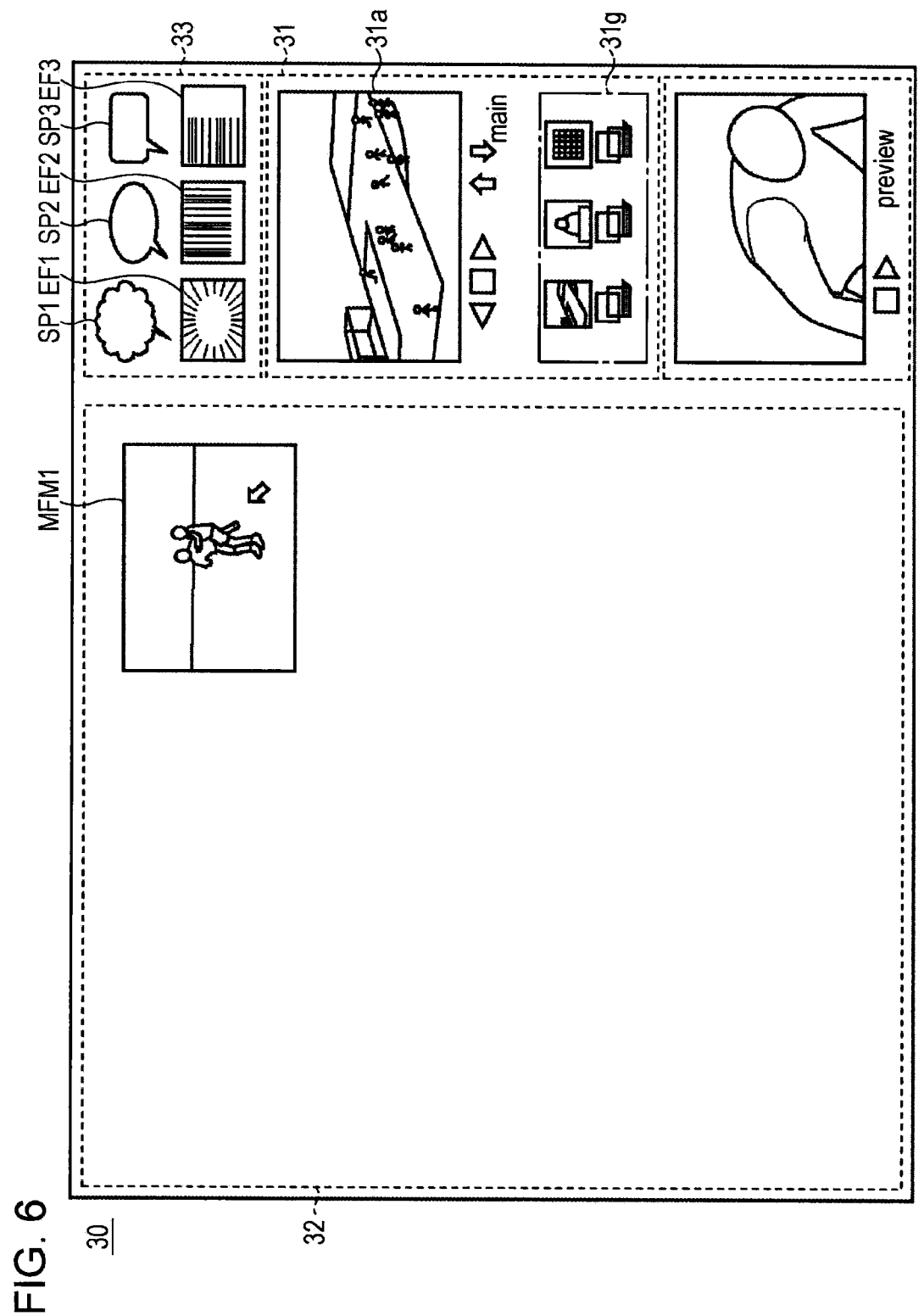
FIG. 6 is an approximate diagram illustrating a configuration (3) of the image processing screen.

After the duplicate image DM is moved to an arbitrary position in the comic region 32 according to the drag operation, when an operation where the mouse button is released (drop operation) is performed, the display control section 21 displays the duplicate image DM in that position as a comic panel MFM1 as shown in FIG. 6.

In a case where the comic panel MFM1 is arranged in the comic region 32, the comic generating section 22 detects the X coordinates and the Y coordinates of the upper right corner of the comic panel MFM1 and inputs the X coordinates and the Y coordinates into the comic panel information FMI corresponding to the comic panel MFM1.

Figure 7:
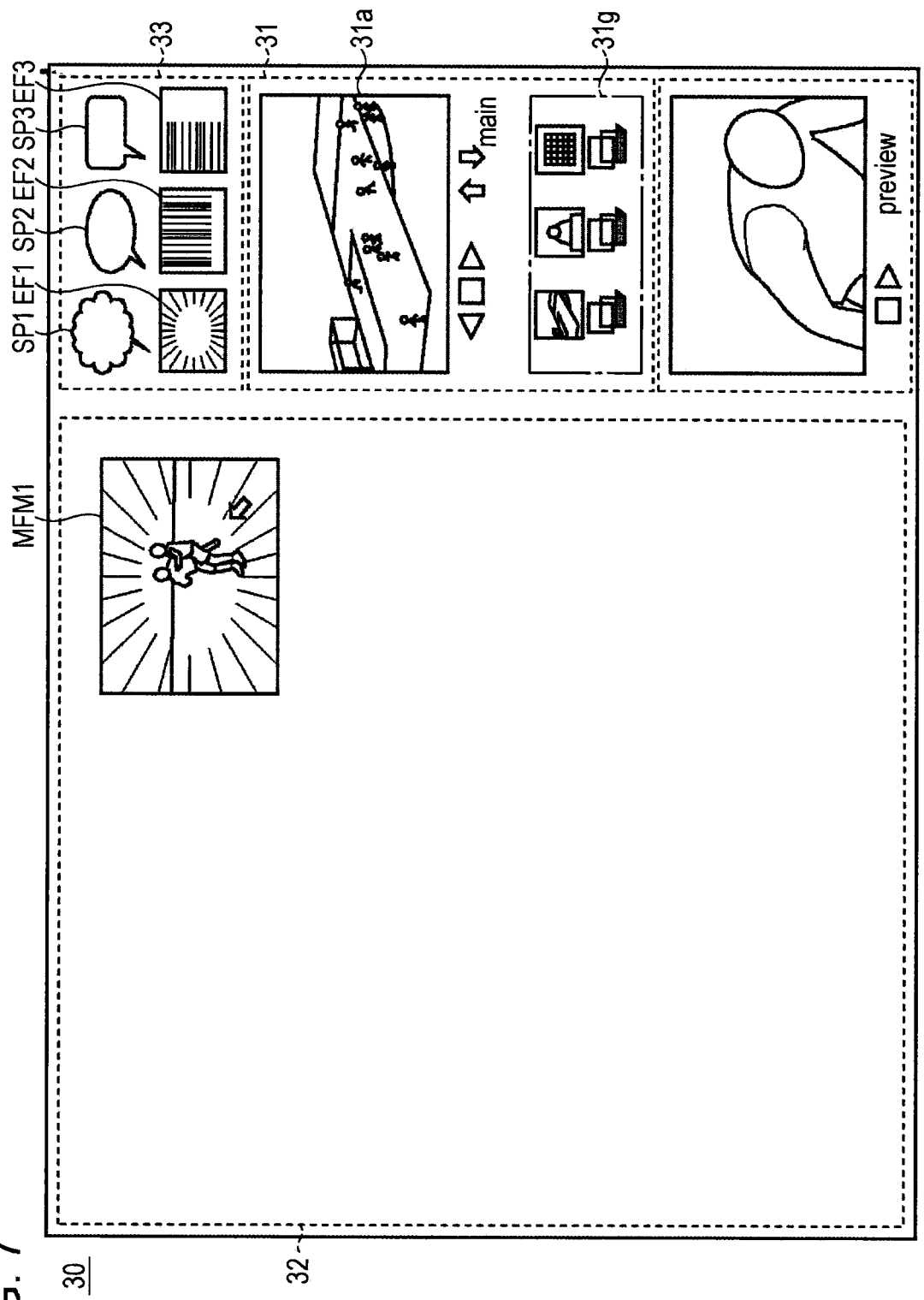
FIG. 7 is an approximate diagram illustrating a configuration (4) of the image processing screen.

In a state where the cursor CS is position on, for example, the effect EF1 of, the item display region 33, the display control section 21 moves the effect EF1 to the comic panel MFM1 arranged in the comic region 32 using a drag and drop operation via the operation input section 14. In this case, the display control section 21 enlarges or shrinks the effect EF1 so that it is the same size as the panel size of the comic panel MFM1, and overlaps and displays the effect EF1 on the comic panel MFM1 as shown in FIG. 7.

In a case where the effect EF1 is arranged with regard to the comic panel MFM1, the comic generating section 22 inputs image data of the effect EF1 into the comic panel information FMI corresponding to the comic panel MFM1.

In a case where, for example, the speech bubble SP1 is moved to the comic panel MFM1 arranged in the comic region 32 using a drag and drop operation via the operation input section 14, the display control section 21 overlaps and displays the speech bubble SP1 on the comic panel MFM1.

Figure 8:
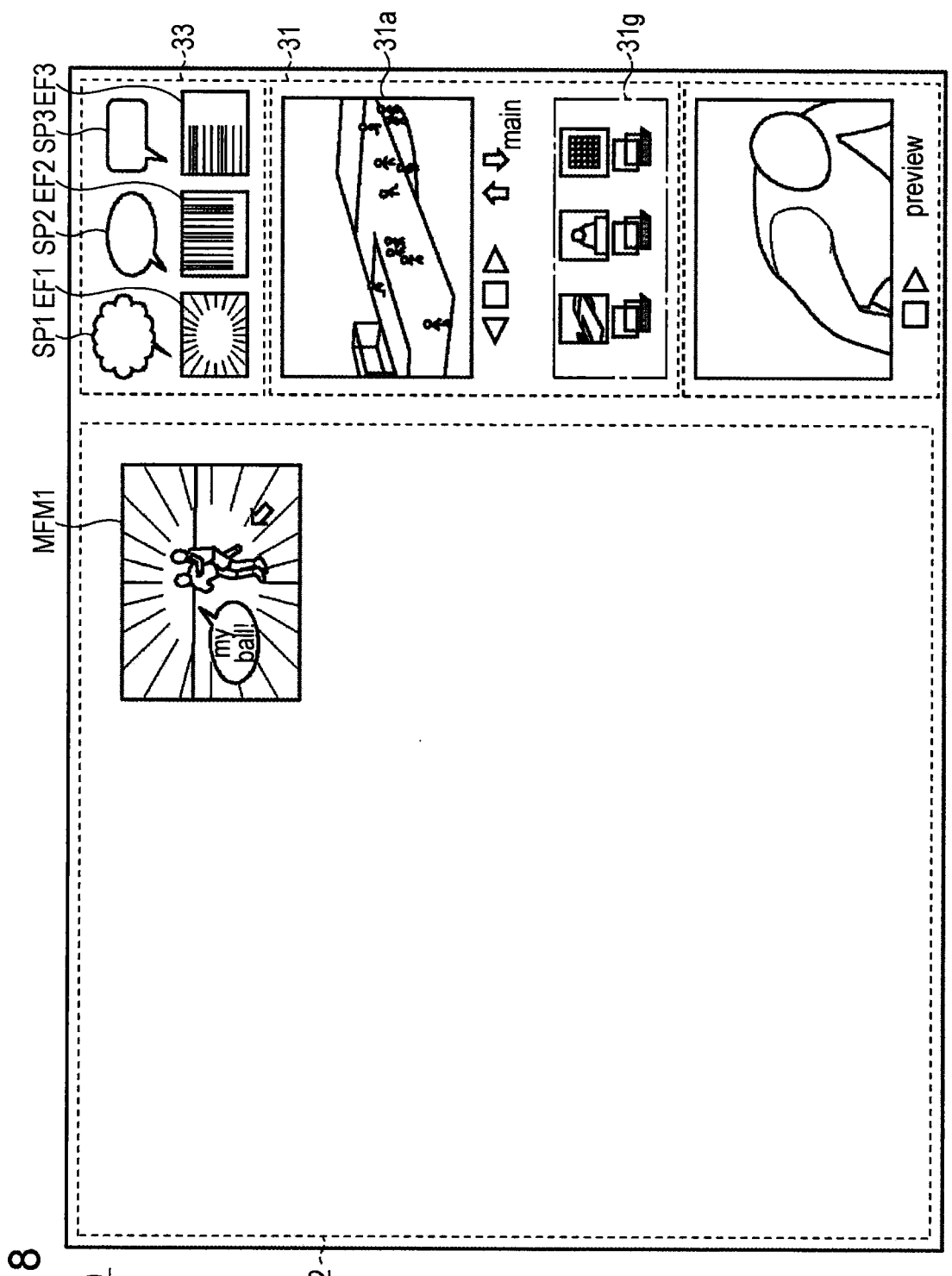
FIG. 8 is an approximate diagram illustrating a configuration (5) of the image processing screen.

Additionally, in a case where a click operation is performed on the speech bubble SP1 overlapped and displayed on the comic panel MFM1 via the cursor CS, the display control section 21 receives input of characters in the speech bubble SP1. Then, the display control section 21 displays the row of characters ("my ball!" in this case), which is input via, for example, a keyboard of, the operation input section 14, in the speech bubble SP1 as shown in FIG. 8.

In a case where the speech bubble SP1 is arranged with regard to the comic panel MFM1, the comic generating section 22 inputs the input row of characters "my ball!" and image data of the speech bubble SP1 into the comic panel information FMI corresponding to the comic panel MFM1.

Each time an arbitrary panel image of the base moving image displayed in the moving-image display window 31*a* is drag-and-drop operated and arranged in the comic region 32, the display control section 21 displays the panel image in a specified position as the comic panel MFM.

In a case where any of the effects EF (EF1 to EF3) of the item display region 33 are arranged on the comic panel MFM arranged in the comic region 32 using a drag and drop operation, the display control section 21 overlaps and displays the effect EF on the comic panel MFM.

Additionally, in a case where any of the speech bubbles SP (SP1 to SP3) of the item display region 33 are arranged on the comic panel MFM arranged in the comic region 32 using a drag and drop operation, the display control section 21 overlaps and displays speech bubble SP on the comic panel MFM.

Furthermore, the display control section 21 selects the speech bubble SP overlapped and displayed on the comic panel MFM and displays the input row of characters in the speech bubble SP.

On the other hand, the comic generating section 22 generates the comic panel information MFI each time the comic panels MFM are arranged in the comic region 32 and inputs the comic page number, the panel reproduction time, the panel size, the panel X coordinates and Y coordinates, and the panel image data.

Additionally, in the case where the effect EF and/or the speech bubble SP are arranged on the comic panel MFM, the comic generating section 22 inputs the image data of the arranged effect EF and/or the image data and the input row of characters of the arranged speech bubble SP into the corresponding comic panel information FMI.

Figure 9:
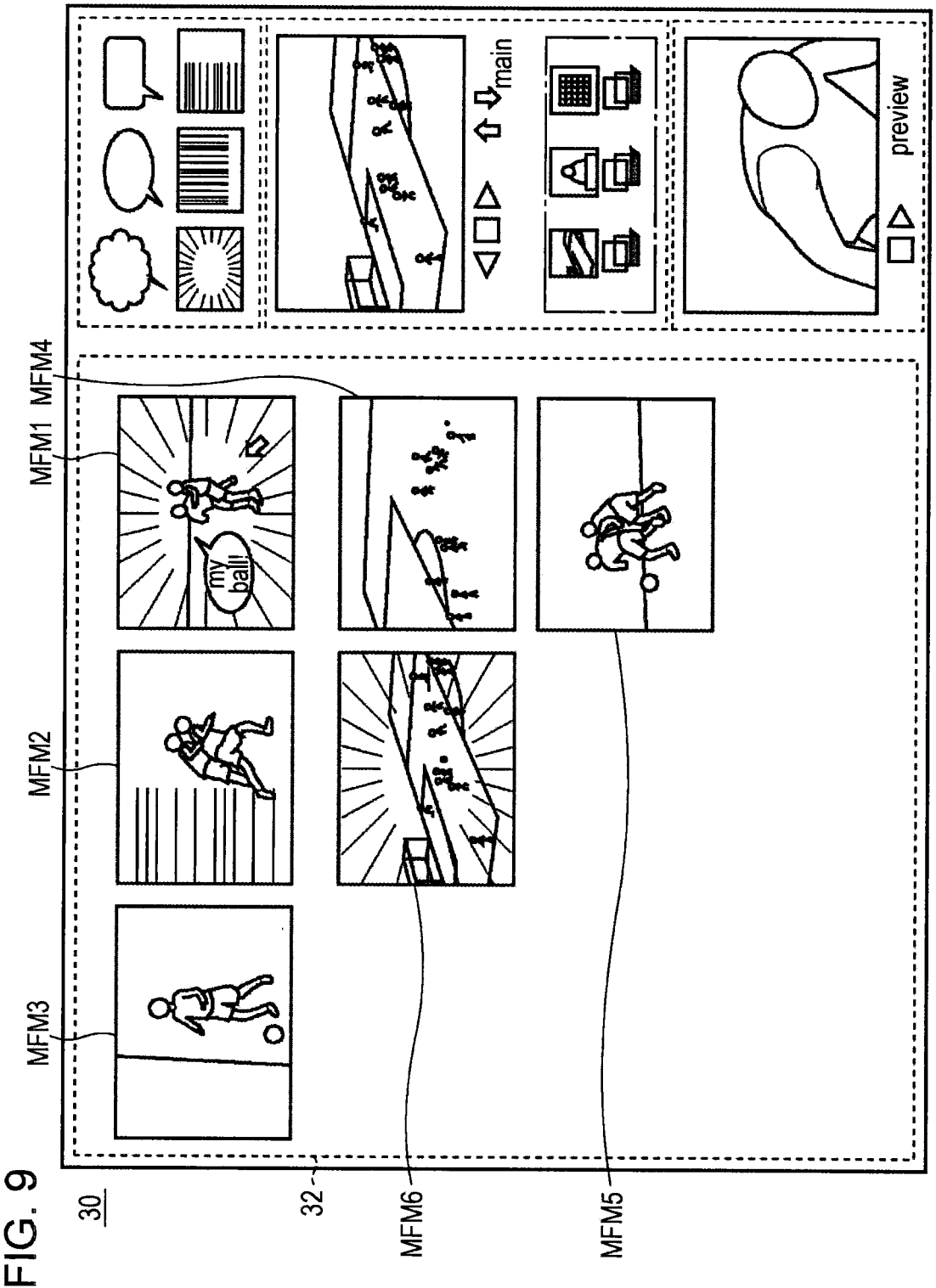
FIG. 9 is an approximate diagram illustrating a configuration (6) of the image processing screen.

In this manner, the display control section 21 displays the comic region 32, where the comic panels MFM1 to MFM6 are arranged according to user operations, on the display section 15, for example, as shown in FIG. 9. Additionally, the comic generating section 22 generates the comic panel information FMI corresponding to each of the comic panels MFM1 to MFM6 and adds the comic panel information FMI to the comic panel information list.

Here, it is possible to change the position and size of the comic panels MFM arranged in the comic region 32.

In the case where the comic panel MFM arranged in the comic region 32 is drag-and-drop operated via the cursor CS, the display control section 21 moves and displays the selected comic panel MFM along with the cursor CS according to the drag operation. Then, the comic panel MFM is arranged in a position where a drop operation is performed.

At this time, the comic generating section 22 detects the X coordinates and the Y coordinates of the moved comic panel MFM and updates the panel X coordinates and Y coordinates in the comic panel information FMI corresponding to the comic panel MFM.

Additionally, in a case where, for example, the lower left corner of the comic panel MFM6 (FIG. 9) is moved downward to the left using a drag and drop operation via the cursor CS, the display control section 21 enlarges and displays the comic panel MFM6 according to the drag operation.

Figure 10:
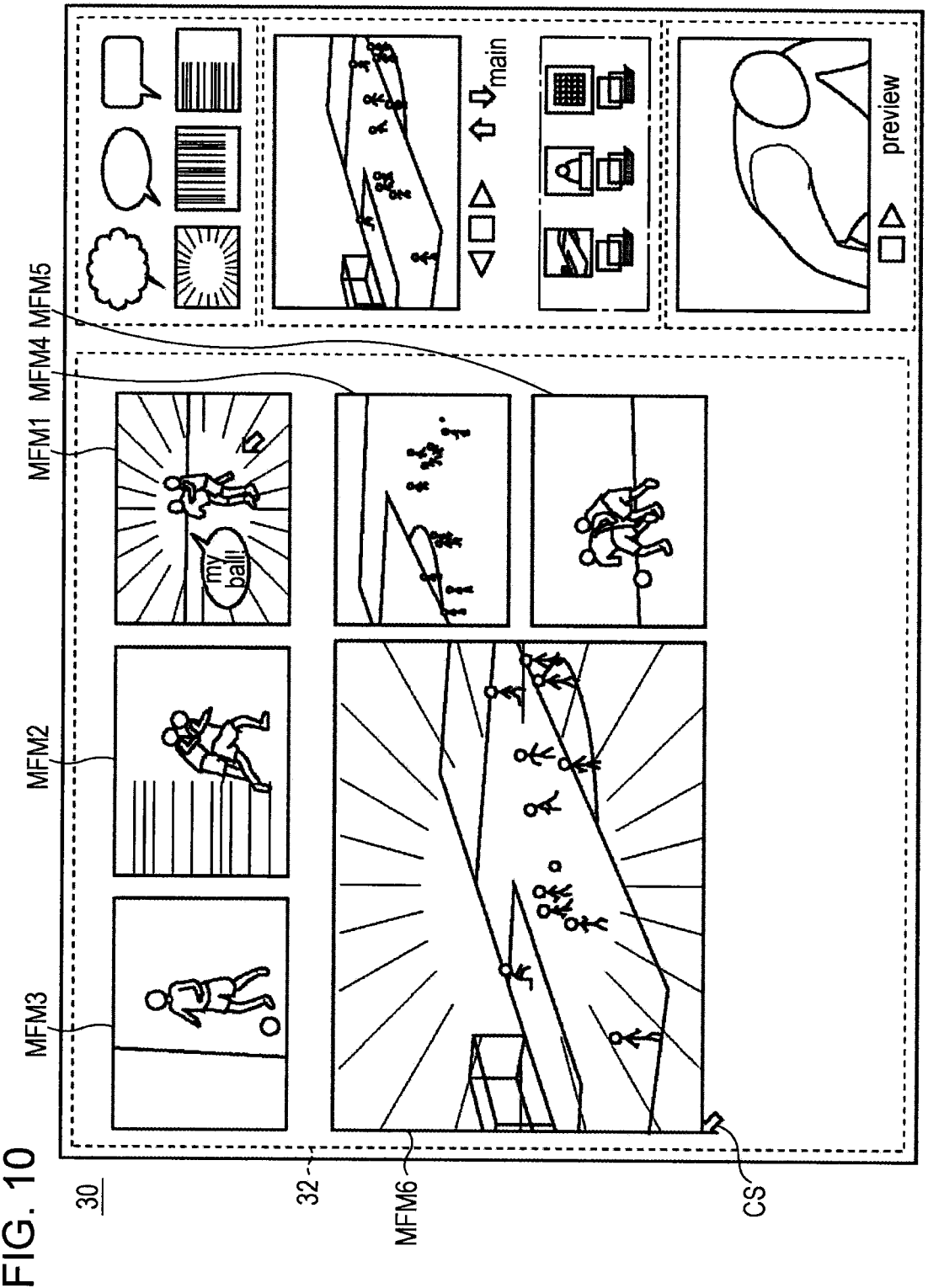
FIG. 10 is an approximate diagram illustrating a configuration (7) of the image processing screen.

Then, the display control section 21 displays the comic panel MFM6 with the size enlarged until the position at the point in time when the drop operation was performed as shown in FIG. 10. In addition, in regard to a case of shrinking, in the same manner, the comic panel MFM is shrunk and displayed according to the movement position using a drag and drop operation via the cursor CS.

In a case where the comic panel MFM is enlarged or shrunk, the comic generating section 22 detects the panel size of the comic panel MFM and updates the panel size in the comic panel information FMI corresponding to the comic panel MFM.

In this manner, the display control section 21 and the comic generating section 22 generate the comic region 32 as a comic by arranging the panel images which configure the base moving images in the comic region 32.

[2-2. Preview Moving-Image Reproduction Process]

In a case where, for example, the reproduction button 34*b* in the preview moving-image reproduction instructing region 34 is click operated, the reproduction form determining section 23 executes a preview moving-image reproduction process. Then, the reproduction form determining section 23 reproduces and displays the preview moving images in the preview moving-image display window 34*a* based on the comic panels MFM arranged in the comic region 32. In addition, in the specific description below, description will be performed using the comic region 32 shown in FIG. 10.

Specifically, when the reproduction button 34*b* is click operated, the reproduction form determining section 23 reads out the comic panel information list stored in the memory section 16. Then, the reproduction form determining section 23 rearranges the corresponding comic panel information FMI in a reading order of a reader of the comic panels MFM arranged in the comic region 32. The rearranging is performed in accordance with the reader reading order rules described above based on the panel X coordinates and Y coordinates and the panel size shown in the comic panel information FMI.

In addition, as the reader reading order in the comic region 32 (FIG. 10), the comic panel MFM1 is first and is continued in order by the comic panels MFM2, MFM3, MFM4, MFM5, and MFM6.

Using the adjacent comic panel information MFI before and after out of the rearranged comic panel information FMI, the reproduction form determining section 23 calculates the reproduction form (reproduction speed and reproduction direction) of the preview images therebetween.

Figure 11A:
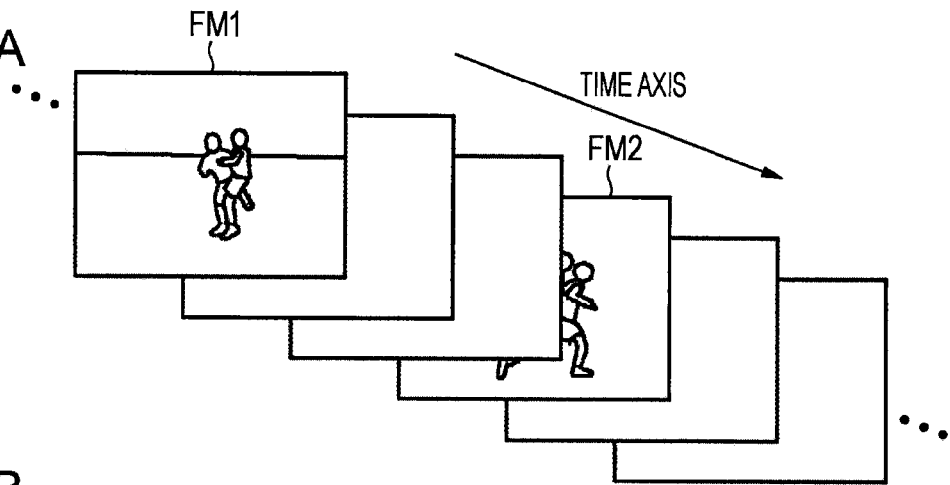
FIGS. 11A to 11E are approximate diagrams for describing a calculation (1) of a reproduction speed and a reproduction direction.

Specifically, a case will be described where a panel image FM1 of the base moving images is before a panel image FM2 on a time axis as shown in FIG. 11A and the comic panel MFM1 arranged in the comic region 32 is before the comic panel MFM2 in the reading order.

Here, the comic panel MFM1 is the panel image FM1 of the base moving images arranged in the comic region 32, and the comic panel MFM2 is the panel image FM2 of the base moving images arranged in the comic region 32. Additionally, the comic panels MFM1 and MFM2 are the standard size (panel size).

That is, a case is described where the order of the panel images FM in the time axis of the base moving images is the same as the reading order of the comic panels MFM corresponding to each of the panel images FM, and the comic panels MFM are the standard size.

The reproduction form determining section 23 reads out panel reproduction times t1 and t2 from the comic panel information FMI corresponding to the adjacent comic panels MFM1 and MFM2 before and after out of the rearranged comic panel information FMI. The panel reproduction times t1 and t2 show the reproduction time of the panel image FM1 and FM2 of the base moving images.

Figure 11B:
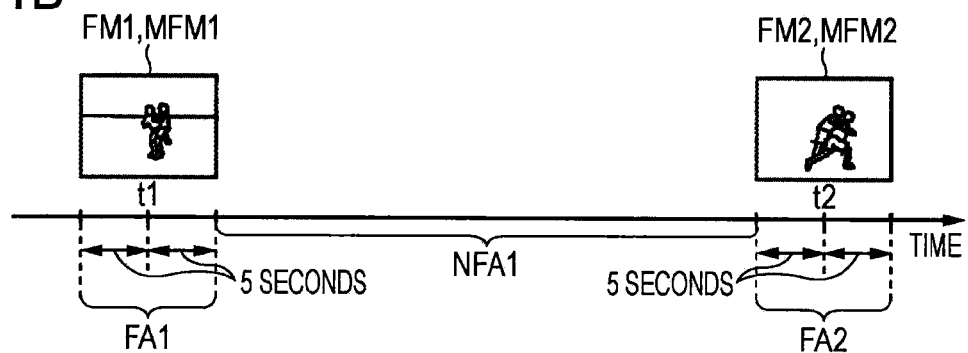

The reproduction form determining section 23 extracts 5 seconds before and after the panel reproduction time t1 of the panel image FM1 of the base moving images as a base as a section of interest FA1 as shown in FIG. 11B. The reproduction form determining section 23 extracts 5 seconds before and after the panel reproduction time t2 of the panel image FM2 of the base moving images as a base as a section of interest FA2.

Additionally, the reproduction form determining section 23 extracts from 5 seconds after the panel reproduction time t1 of the panel image FM1 until 5 seconds before the panel reproduction time t2 of the panel image FM2 of the base moving images as a section of non-interest NFA1.

Figure 11C:
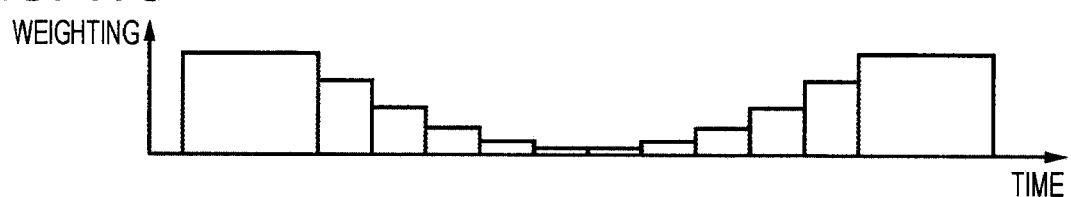

The reproduction form determining section 23 reads out the panel sizes of the comic panels MFM1 and MFM2 from the corresponding comic panel information FMI and calculates the ratio "1" with the standard panel size as a weighting of the sections of interest FA1 and FA2 as shown in FIG. 11C.

Additionally, the reproduction form determining section 23 divides the extracted section of non-interest NFA1 into 10 equal portions and calculates a weighting for each of the divided portions of the section of non-interest NFA1 using a one-dimensional Fisher algorithm so that the weightings are smaller the greater the separating distance from the panel reproduction times t1 and t2.

Figure 11D:
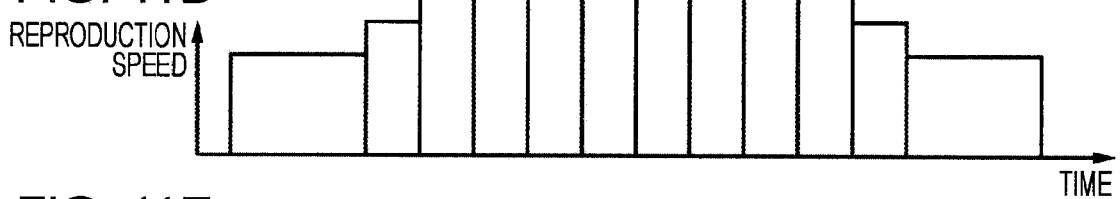

The reproduction form determining section 23 calculates the inverse of the weighting of each section as the reproduction speed of the section as shown in FIG. 11D.

Therefore, the reproduction speeds are determined so that the sections of interest FA1 and FA2 are reproduced at a linear rate of normal reproduction (normal speed) and the section of non-interest NFA1 is reproduced in a non-linear rate where the speed is faster when further from the sections of interest FA1 and FA2.

Figure 11E:
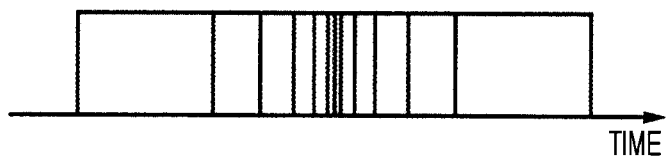

According to this, in the preview moving images which are the base moving images reproduced at the reproduction speed determined by the reproduction form determining section 23 as shown in FIG. 11E, the reproduction time of the section of non-interest NFA1 is shrunk (reduced).

Figure 12A:
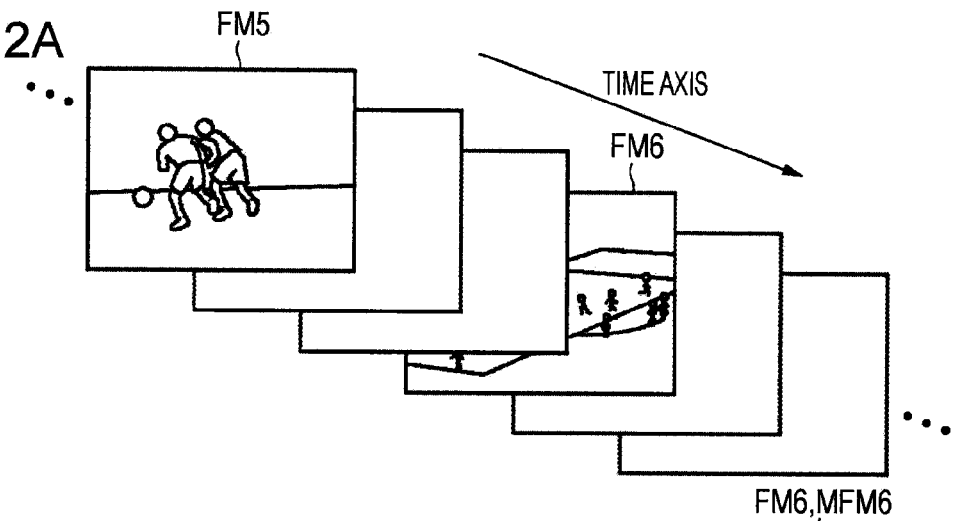
FIGS. 12A to 12E are approximate diagrams for describing a calculation (2) of a reproduction speed and a reproduction direction.

Next, a case will be described where a panel image FM5 of the base moving images is before a panel image FM6 on the time axis as shown in FIG. 12A, the comic panel MFM5 arranged in the comic region 32 is before the comic panel MFM6 in the reading order, and the comic panel MFM6 is double the standard size.

Here, the comic panel MFM5 is the panel image FM5 of the base moving images arranged in the comic region 32, and the comic panel MFM6 is the panel image FM6 of the base moving images arranged in the comic region 32.

That is, a case is described where the order of the panel images FM in the time axis of the base moving images is the same as the reading order of the comic panels MFM corresponding to each of the panel images FM, and the comic panels MFM which are not the standard size are included.

The reproduction form determining section 23 reads out panel reproduction times t5 and t6 from the comic panel information FMI corresponding to the adjacent comic panels MFM5 and MFM6 before and after out of the rearranged comic panel information FMI. The panel reproduction times t5 and t6 show the reproduction time of the panel image FM5 and FM6 of the base moving images.

Figure 12B:
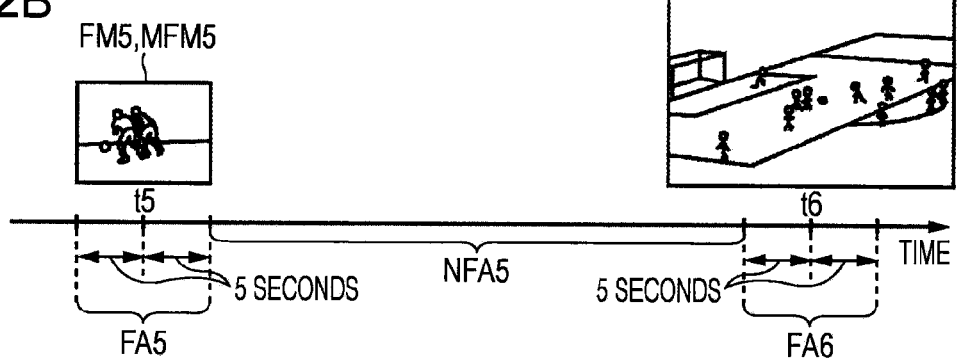

The reproduction form determining section 23 extracts 5 seconds before and after the panel reproduction time t5 of the panel image FM5 of the base moving images as a base as a section of interest FA5 as shown in FIG. 12B. The reproduction form determining section 23 extracts 5 seconds before and after the panel reproduction time t6 of the panel image FM6 of the base moving images as a base as a section of interest FA6.

Additionally, the reproduction form determining section 23 extracts from 5 seconds after the panel reproduction time t5 of the panel image FM5 until 5 seconds before the panel reproduction time t6 of the panel image FM6 of the base moving images as a section of non-interest NFA5.

Figure 12C:
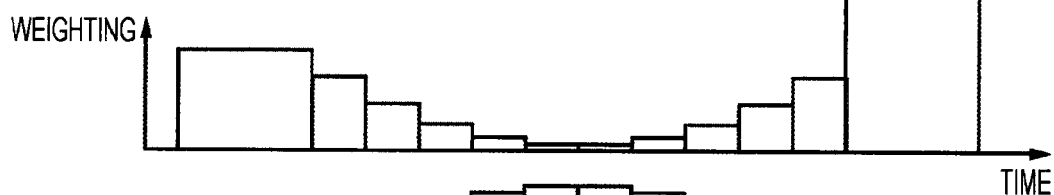

The reproduction form determining section 23 reads out the panel sizes of the comic panels MFM5 and MFM6 from the corresponding comic panel information EMI and calculates the ratio "1" and "2" with the standard panel size as a weighting of the sections of interest FA5 and FA6 as shown in FIG. 12C.

Additionally, the reproduction form determining section 23 divides the extracted section of non-interest NFA5 into 10 equal portions and calculates a weighting for each of the divided portions of the section of non-interest NFA5 using a one-dimensional Fisher algorithm so that the weightings are smaller the greater the separating distance from the panel reproduction times t5 and t6.

Figure 12D:
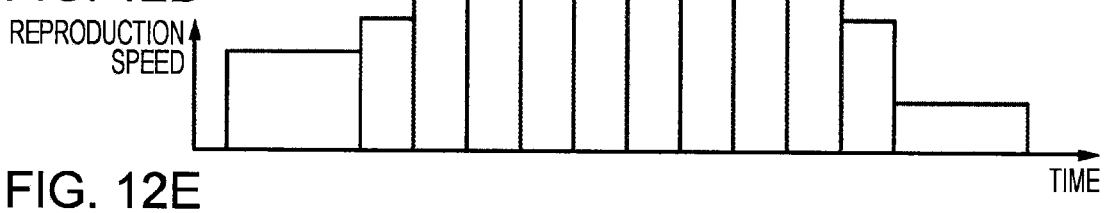

The reproduction form determining section 23 calculates the inverse of the weighting of each section as the reproduction speed of the section as shown in FIG. 12D.

Therefore, the reproduction speeds are determined so that the section of interest FA5 is reproduced at a linear rate of normal reproduction (normal speed), the section of interest FA6 is reproduced at a half-speed linear rate, and the section of non-interest NFA5 is reproduced in a non-linear rate where the speed is faster when further from the sections of interest FA5 and FA6.

Figure 12E:
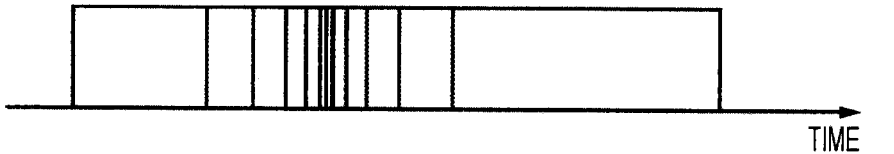

According to this, in the preview moving images which are the base moving images reproduced at the reproduction speed determined by the reproduction form determining section 23 as shown in FIG. 12E, the reproduction time of the section of non-interest NFA5 is shrunk (reduced). Additionally, the section of interest FA6 corresponding to the comic panel MFM6 with the panel size larger than the standard size is reproduced at a speed slower than normal reproduction (slow-motion).

Figure 13A:
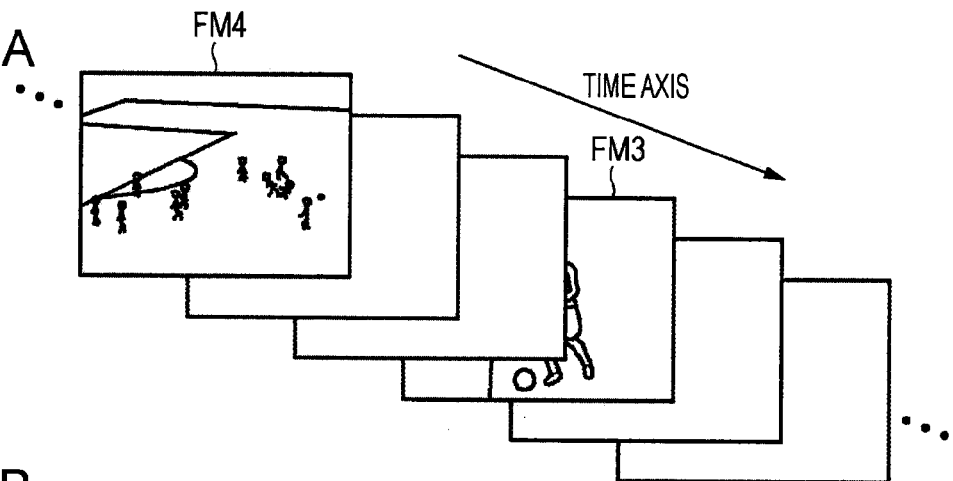
FIGS. 13A to 13E are approximate diagrams for describing a calculation (3) of a reproduction speed and a reproduction direction.

Next, a case will be described where, for example, a panel image FM3 of the base moving images is after a panel image FM4 on the time axis as shown in FIG. 13A and the comic panel MFM3 arranged in the comic region 32 is before the comic panel MFM4 in the reading order.

Here, the comic panel MFM3 is the panel image FM3 of the base moving images arranged in the comic region 32, and the comic panel MFM4 is the panel image FM4 of the base moving images arranged in the comic region 32. Additionally, the comic panels MFM3 and MFM4 are the standard size (panel size).

That is, a case is described where the order of the panel images FM in the time axis of the base moving images is the opposite of the reading order of the comic panels MFM corresponding to each of the panel images FM, and the comic panels MFM are the standard size.

The reproduction form determining section 23 reads out panel reproduction times t3 and t4 from the comic panel information FMI corresponding to the adjacent comic panels MFM3 and MFM4 before and after out of the rearranged comic panel information FMI. The panel reproduction times t3 and t4 show the reproduction time of the panel image FM3 and FM4 of the base moving images.

Figure 13B:
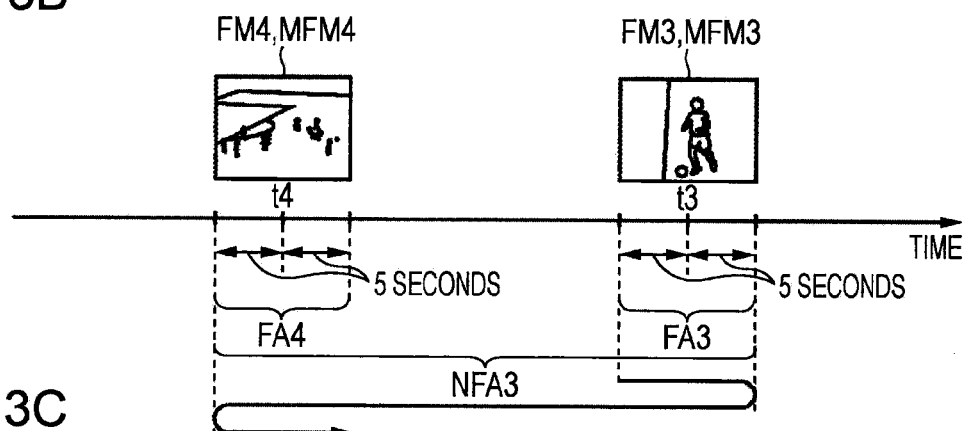

The reproduction form determining section 23 extracts 5 seconds before and after the panel reproduction time t3 of the panel image FM3 of the base moving images as a base as a section of interest FA3 as shown in FIG. 13B. The reproduction form determining section 23 extracts 5 seconds before and after the panel reproduction time t4 of the panel image FM4 of the base moving images as a base as a section of interest FA4.

Additionally, the reproduction form determining section 23 extracts from 5 seconds after the panel reproduction time t3 of the panel image FM3 until 5 seconds before the panel reproduction time t4 of the panel image FM4 of the base moving images as a section of non-interest NFA3.

The section of non-interest NFA3 is an ordering where the panel images, which are from 5 seconds after the panel reproduction time t3 until 5 seconds before the panel reproduction time t4, are continuous in a reverse direction to the time axis direction so that reproduction is performed in a reverse direction (reverse reproduction) from the panel images which come afterwards in the time axis to the panel images which come beforehand in the time axis of the base moving images.

Figure 13C:
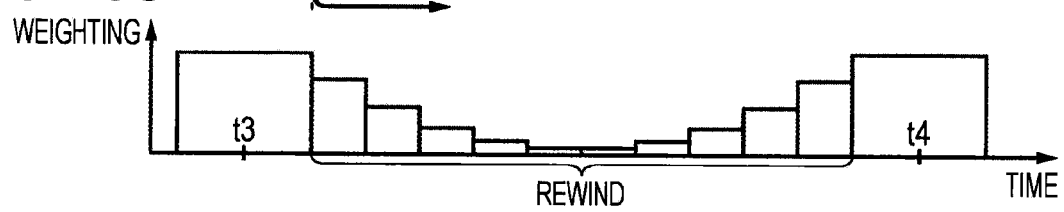

The reproduction form determining section 23 reads out the panel sizes of the comic panels MFM3 and MFM4 from the corresponding comic panel information FMI and calculates the ratio "1" with the standard panel size as a weighting of the sections of interest FA3 and FA4 as shown in FIG. 13C.

Additionally, the reproduction form determining section 23 divides the extracted section of non-interest NFA3 into 10 equal portions and calculates a weighting for each of the divided portions of the section of non-interest NFA3 using a one-dimensional Fisher algorithm so that the weightings are smaller the greater the separating distance from the panel reproduction times t3 and t4.

Figure 13D:
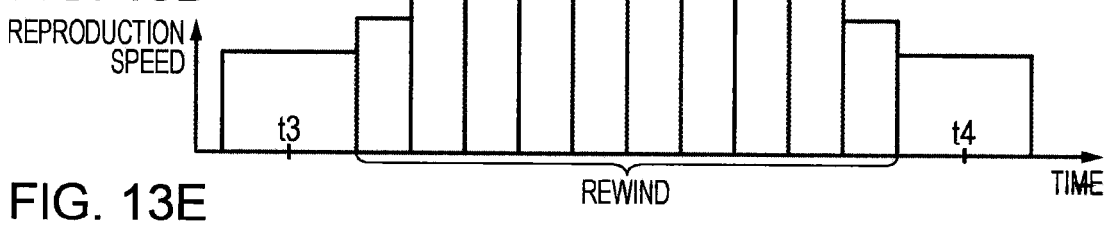

The reproduction form determining section 23 calculates the inverse of the weighting of each section as the reproduction speed of the section as shown in FIG. 13D.

Therefore, the reproduction speeds are determined so that the sections of interest FA3 and FA4 are reproduced at a linear rate of normal reproduction (normal speed) and the section of non-interest NFA3 is reproduced in reverse in a non-linear rate where the speed is faster when further from the sections of interest FA3 and FA4.

Figure 13E:
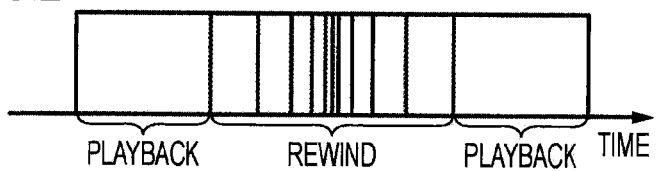

According to this, in the preview moving images which are the base moving images reproduced at the reproduction speed determined by the reproduction form determining section 23 as shown in FIG. 13E, the reproduction time of the section of non-interest NFA3 is shrunk (reduced) and reproduced in reverse.

Here, in regard to a portion which is before the panel image FM1 of the base moving images which corresponds to the comic panel MFM1 which is read first by a reader of the comic region 32, the reproduction form determining section 23 divides before the section of interest FA1 including the panel image FM1 into predetermined intervals. Then, the reproduction form determining section 23 calculates the reproduction speed using a one-dimensional Fisher algorithm so that the speed is faster when further from the section of interest FA1.

Additionally, in regard to a portion which is after the panel image FM6 of the base moving images which corresponds to the comic panel MFM6 which is read last by a reader of the comic region 32, the reproduction form determining section 23 divides after the section of interest FA6 including the panel image FM6 into predetermined intervals. Then, the reproduction form determining section 23 calculates the reproduction speed using a one-dimensional Fisher algorithm so that the speed is faster when further from the section of interest FA6.

In the case where the reproduction button 34b is operated, the display control section 21 reproduces and displays the base moving images as the preview moving images in the preview display window 34a at the reproduction speed calculated by the reproduction form determining section 23.

Additionally, when playing back the sections of interest FA1 to FA6, the display control section 21 reads out the comic panel information FMI of the comic panels MFM1 to MFM6 corresponding to the sections of interest FA1 to FA6. Then, in the case where the effect EF and/or the speech bubble SP are set in the comic panel MFM, the display control section 21 overlaps and displays the effect EF and/or the speech bubble SP showing the row of characters in the sections of interest FA1 to FA6. For example, in the case where the section of interest FA1 is reproduced, the effect EF1 and the speech bubble SP1 showing "my ball!" are overlapped and displayed at the normal reproduction speed.

In a case where the save button 34d is operated, the display control section 21 stores the preview moving images, which have been reproduced at the reproduction speed calculated by the reproduction form determining section 23 and been overlapped with the effect EF and/or the speech bubble SP showing the row of characters in the sections of interest FA1 to FA6, in the predetermined formatting.

3. Sequences

3-1. Comic Generating Process Sequence

Figure 14:
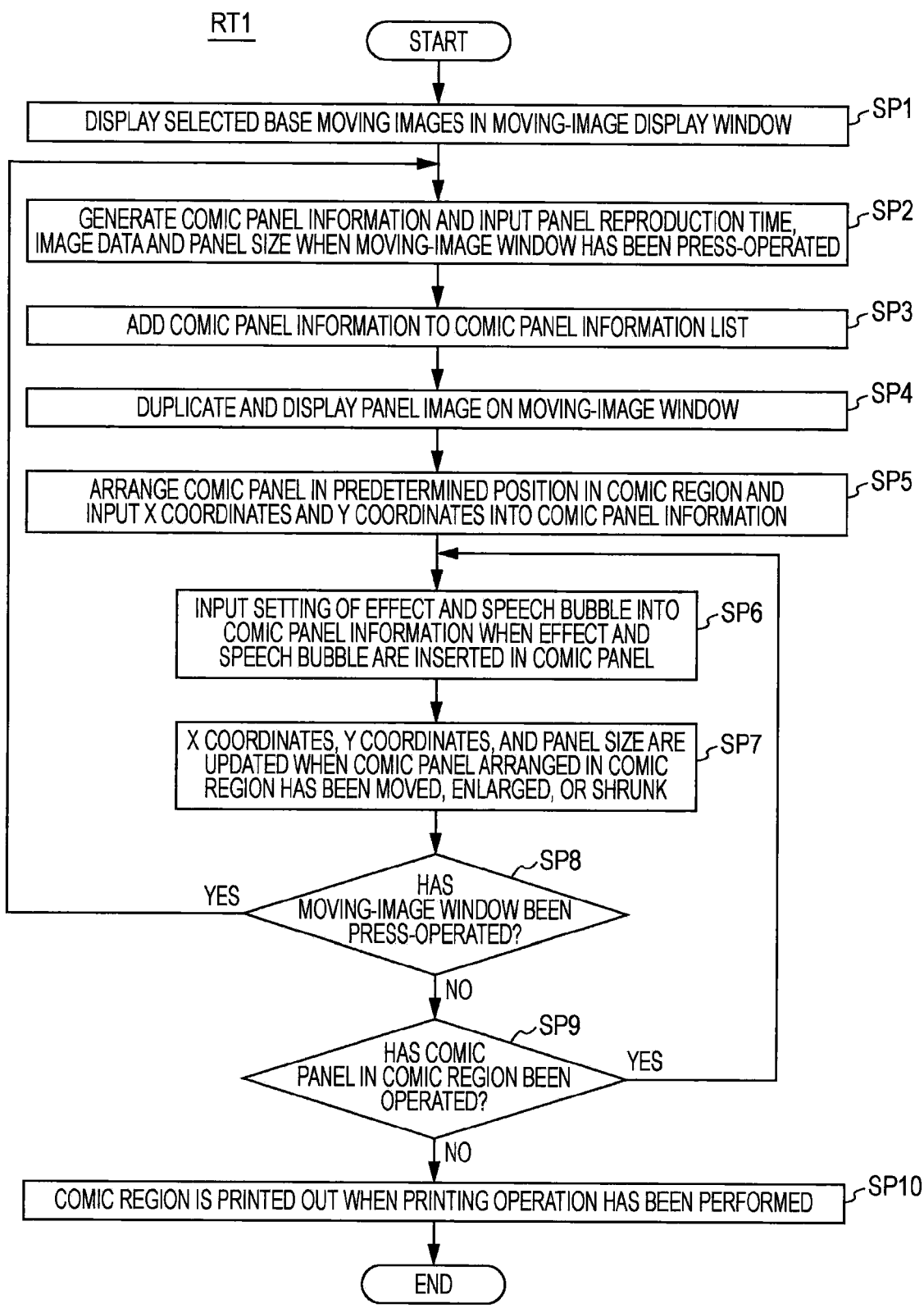
FIG. 14 is a flow chart for describing a comic generating process sequence.

Next, the sequence of the comic generating process described above will be described using the flow chart of FIG. 14.

The CPU 11 moves from a starting step of a routine RT1 to the next step SP1, and out of the moving images displayed in the candidate display region 31g, the base moving images which are to be editing targets are displayed in the moving-image display window 31a according to user operations and moves to the next step SP2.

In step SP2, in the case where the moving-image display window 31a is press operated via the cursor CS, the CPU 11 generates the comic panel information FMI. Additionally, the CPU 11 inputs the panel reproduction time, the image data and the standard panel size of the panel image FM, which is displayed in the moving-image display window 31a when the press operation is performed, into the comic panel information FMI and moves to the next step SP3.

In step SP3, the CPU 11 adds the comic panel information FMI generated in step SP2 to the comic panel information list and moves to the next step SP4.

In step SP4, the CPU 11 generates a duplicate of the panel image FM displayed on the moving-image display window 31a when the press operation is performed in step SP2, overlaps and displays the generated duplicate image DM on the moving-image display window 31a so as to be able to be moved, and moves to the next step SP5.

In step SP5, the CPU 11 arranges the duplicate image DM as the comic panel MFM in an arbitrary position in the comic region 32 specified according to the operation of the operation input section 14. Additionally, the CPU 11 inputs the X coordinates and the Y coordinates of the arranged comic panel MFM into the comic panel information FMI corresponding to the arranged comic panel MFM and moves to the next step SP6.

In step SP6, in the case where the effect EF and the speech bubble SP are inserted into the comic panel MFM arranged in the comic region 32 using a drag and drop operation, the CPU 11 overlaps and displays the effect EF and the speech bubble SP inserted onto the comic panel MFM. Additionally, the CPU 11 inputs the settings of the inserted effect EF and the speech bubble SP into the comic panel information FMI corresponding to the comic panel MFM inserted with the effect EF and the speech bubble SP and moves to the next step SP7.

In step SP7, in a case where the comic panel MFM arranged in the comic region 32 has been moved, enlarged, or shrunk, the CPU 11 inputs (updates) the X coordinates, the Y coordinates, and the panel size which have been changed into the comic panel information FMI corresponding to the comic panel MFM.

In the next step SP8, the CPU 11 determines whether or not the moving-image display window 31a has been press-operated again, and moves to step SP2 when a positive result is obtained and from step SP2 to step SP7 are repeatedly performed.

In step SP9, the CPU 11 determines whether or not an operation of any of an insertion of the effect EF and/or the speech bubble SP, movement, enlarging, shrinking or the like has been performed with regard to the comic panel MFM arranged in the comic region 32. Here, when a positive result is obtained, the CPU 11 returns to step SP6, and in steps SP6 and SP7, processing is executing according to the operation content.

In this manner, while repeatedly performing from step SP2 to step SP9, the CPU 11 generates the comic region 32 as a comic by arranging the panel images FM in the comic region 32 as elements of the base moving images displayed in the moving-image display window 31a.

In step SP10, in a case where an operation which is to print out the comic region 32 is performed, the CPU 11 prints out the comic region 32, moves to the next step, and the process is completed.

3-2. Preview Moving-Image Reproduction Process Sequence

Figure 15:
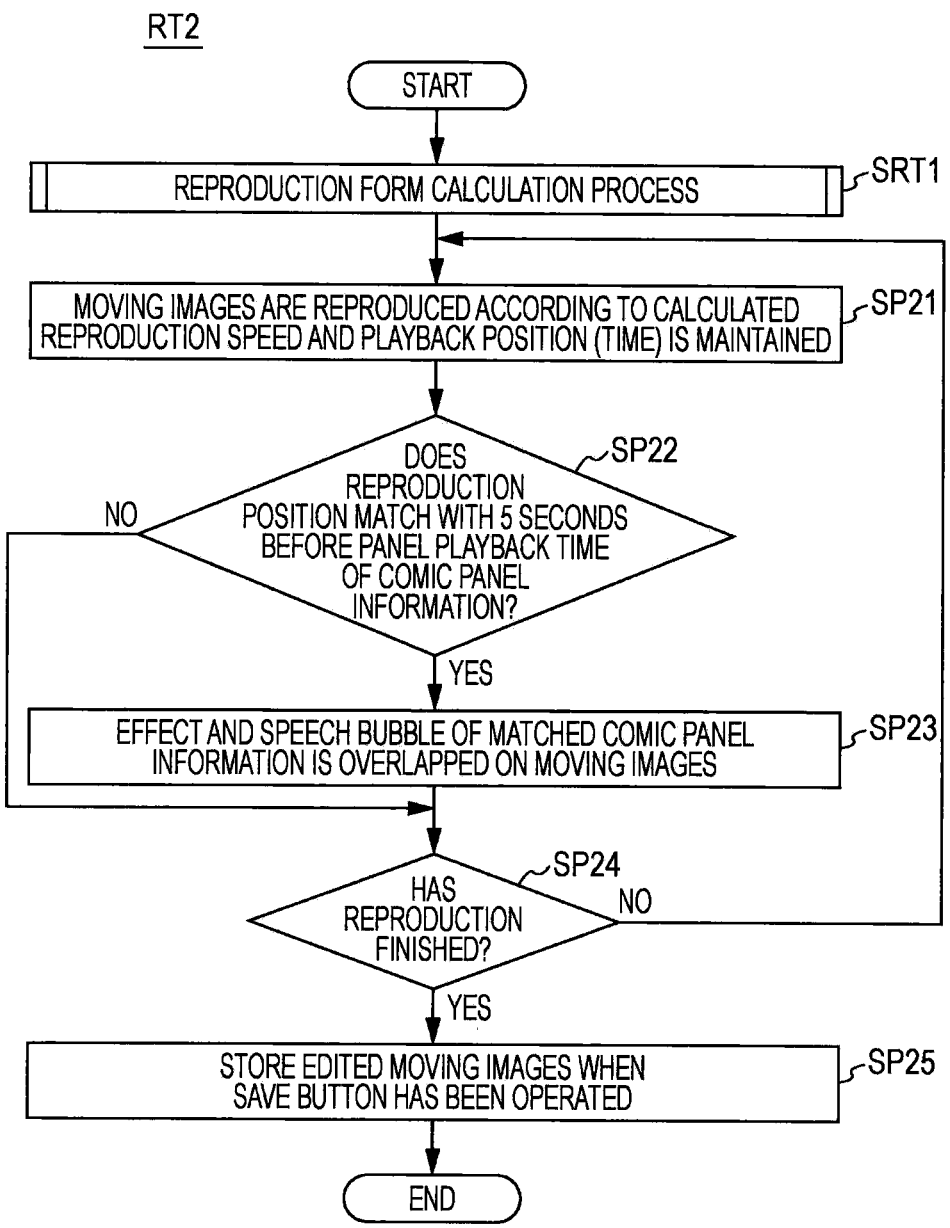
FIG. 15 is a flow chart for describing a moving-image reproduction process sequence.
Figure 16:
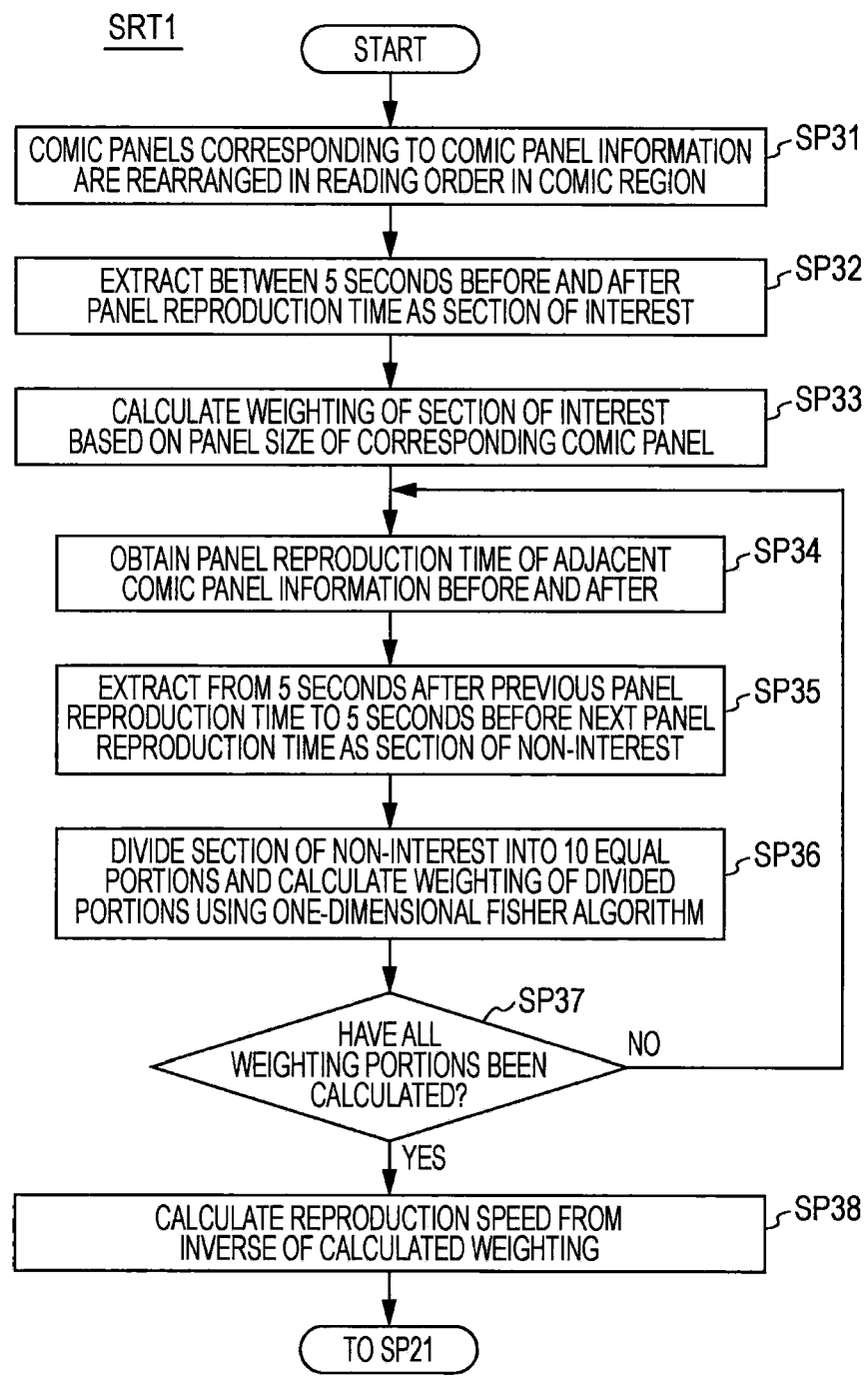
FIG. 16 is a flow chart for describing a reproduction form calculation process sequence.

Next, the sequence of the preview moving-image reproduction process described above will be described using the flow charts of FIGS. 15 and 16.

The CPU 11 moves from a starting step of a routine RT2 (FIG. 15) to the next subroutine SRT1 (FIG. 16) and executes a reproduction form calculation process. Specifically, the CPU 11 enters from a starting step of the subroutine SRT1 and moves to the next step SP31. Then, in the reading order of the comic panels MFM arranged in the comic region 32, the CPU 11 rearranges the corresponding comic panel information FMI and moves to the next step SP32.

In step SP32, the CPU 11 extracts 5 seconds before and after the panel reproduction time in the comic panel information FMI as a section of interest FA and moves to the next step SP33.

In step SP33, the CPU 11 calculates the weighting of the section of interest FA based on the panel size of the corresponding comic panel MFM in the comic panel information FMI and moves to the next step SP34.

In step SP34, the CPU 11 obtains the panel reproduction time of the adjacent comic panel information FMI before and after, and moves to the next step SP35.

In step SP35, the CPU 11 extracts from 5 seconds after the panel reproduction time in the previous comic panel information FMI to 5 seconds before the panel reproduction time in the next comic panel information FMI as a section of non-interest NFA and moves to the next step SP36.

In step SP36, the CPU 11 divides the section of non-interest NFA into 10 equal portions, calculates the weighting of each of the portions divided into 10 using a one-dimensional Fisher algorithm, and moves to the next step SP37.

In step SP37, the CPU 11 determines whether or not all of the weightings of the portions have been calculated, and returns to step SP34 when a positive result is obtained and the weighting of a different section of non-interest NFA is calculated in steps SP34 to step SP36.

With regard to this, in a case where all of the weightings of the portions have been calculated, the CPU 11 moves to step SP38, calculates the inverse of the calculated weightings of each of the portions as the reproduction speed of the portions, completes the subroutine SRT1, and moves to the next step SP21.

In step SP21 (FIG. 15), the CPU 11 reproduces the base moving images as the preview moving images according to the reproduction speed calculated in the subroutine SRT1, maintains the reproduction position (time) during reproduction, and moves to the next step SP22.

In step SP22, the CPU 11 determines whether or not the reproduction position maintained in step SP21 matches with 5 seconds before the panel reproduction time of the comic panel information FMI and moves to step SP23 when a positive result is obtained.

In step SP23, in a case where the matched effect EF and the speech bubble SP of the comic panel information FMI are input, the CPU 11 overlaps and displays the effect EF and the speech bubble SP on the preview moving images when the corresponding section of interest FA is being reproduced, and moves to the next step SP24.

On the other hand, when a negative result is obtained in step SP22, the CPU 11 moves to step SP24 without performing step SP23.

In step SP24, the CPU 11 determines whether or not the reproduction of the preview moving images has finished, and until the reproduction of the preview moving images has finished, the steps SP21 to SP24 are repeatedly performed.

In step SP24, in a case where it is determined that the reproduction of the preview moving images has finished, the CPU 11 moves to step SP25, stores the edited preview moving images in the memory section 16 in the case where the save button 34d has been operated, moves to the next step, the process is completed.

4. Operation and Effect

In the above configuration, the image processing device 1 generates the comic region 32 as a comic by arranging the panel images FM, which configure the base moving images displayed in the moving-image display window 31a, in a arbitrary position and size in the comic region 32 as the comic panels MFM.

The image processing device 1 determines the reproduction form of the base moving images according to the comic panels MFM arranged in the generated comic and generates the base moving images as the preview moving images based on the reproduction form.

According to this, it is possible for the image processing device 1 to create a comic with a simple operation of arranging the panel images FM as elements of the base moving images in the comic region 32 as the comic panels MFM.

Here, the generated comic panels MFM arranged in the comic region 32 are panel images which are of interest to the user and which the user has extracted from the base moving images, and in addition, the size thereof shows the level of interest.

Therefore, the image processing device 1 reproduces the vicinity of the comic panels MFM (5 seconds before and after) arranged in the comic region 32 in a linear rate in proportion to the size of the comic panels MFM and reproduces other portions in a non-linear rate so that the reproduction speed is faster when further from the comic panels MFM arranged in the comic region 32. According to this, it is possible for the image processing device 1 to generate the preview moving images which reflect the intent of a comic writer.

Additionally, in a case where the comic region 32 is viewed from a standpoint of generating the preview moving images, since by just arranging the panel images FM of the base moving images in a comic reading order, the preview moving images are reproduced in that order, it is possible to intuitively grasp the time axis of the preview moving images. That is, it is possible for the image processing device 1 to intuitively express the time axis of the preview moving images as a comic.

In this manner, it is possible for the image processing device 1 to provide a user with a new expression method of moving image reproduction in that it is possible to set the reproduction form (reproduction speed and reproduction axis) of the preview moving images in a two-dimensional surface that is a comic.

Additionally, it is possible for the image processing device 1 to generate the preview moving images by storing the base moving images and the comic panel information list of the comic panels MFM arranged in the comic region 32. Therefore, for example, it is possible to perform the editing operation of the preview images in collaboration between different users by sharing the base images and the comic panel information list between different computers, and it is possible for the image processing device 1 to be use as a new communication tool.

Figure 17:
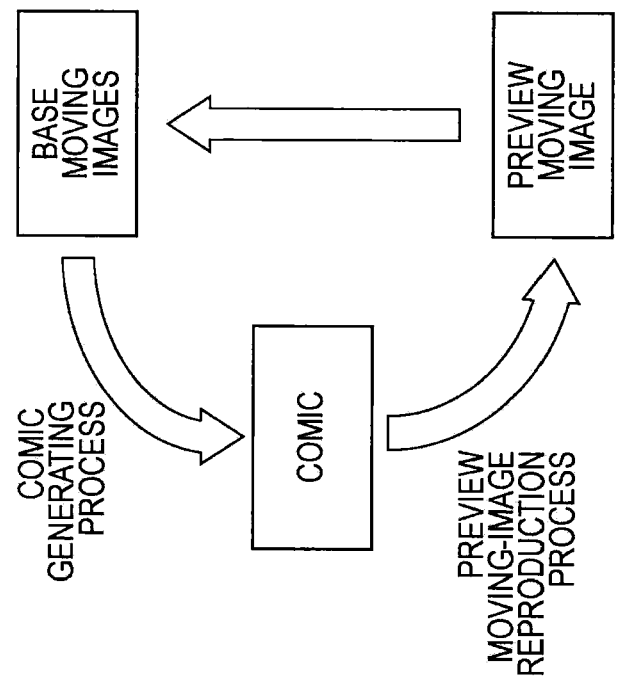
FIG. 17 is an approximate diagram illustrating a relationship of base moving images, a comic, and preview moving images.

Furthermore, the image processing device 1 generates a comic based on the base moving images in the comic generating process and it is considered that the preview moving-image reproduction process based on the comic does not only generating the preview moving images but also the preview moving images may be used again as the base moving images as shown in FIG. 17.

In this case, in the image processing device 1, since it is possible to generate a new comic and preview moving images based on the preview moving images generated once, it is possible to repeatedly perform the editing operation any number of times.

According to the configuration above, the panel images of the base moving images are arranged in the comic region 32 and a comic is generated, and the reproduction form of the preview moving images is determined according to the comic panels MFM arranged in the comic. According to this, it is possible to determine the reproduction form of the preview moving images in an expression form which does not currently exist which is determining the reproduction form of the preview moving images using a comic which are elements of the base moving images in two dimensions, and it is possible to impress expressiveness.

2. Other Embodiments

In addition, in the embodiment described above, the case is described where within the comic region 32 is printed out in step SP10 of the comic generating process sequence. The embodiment is not limited to this and in the case where an operation which is to print out the comic region 32 is performed, it is possible to print out at any timing.

Additionally, in the embodiment described above, the case is described where 5 seconds before and after the panel reproduction time corresponding to the comic panel MFM arranged in the comic region 32 is set as the section of interest FA. The embodiment is not limited to this, and for example, an arbitrary range, such as 3 second before and after the panel reproduction time or from 3 seconds before to 5 seconds after the panel reproduction time, may be set as the section of interest FA. In addition, the section of interest FA may be set by the user.

As a different example, the section of interest FA may be set based on the panel size of the comic panel MFM. Specifically, the reproduction form determining section 23 reads out the panel size from the comic panel information FMI corresponding to the comic panel MFM, and in a case where the panel size is the standard size, for example, 5 second before and after the panel reproduction time is set as the section of interest FA. In addition, in a case where the panel size is not the standard size, the reproduction form determining section 23 changes the section of interest FA according to a ratio with the standard panel size. According to this, it is possible to reproduction with a longer time linear rate and view the vicinity of the panel images FM corresponding to the comic panels MFM with a large panel size.

Additionally, in the embodiment described above, the case is described where the comic region 32 is displayed as it is when the preview moving images are being reproduced. The embodiment is not limited to this, and when playing back the preview images, when the section of interest FA in the preview moving images is being reproduced, the comic panel MFM corresponding to the section of interest FA may be displayed, for example, so as to flash on and off. According to this, it is possible to easily determine the corresponding relationship between the comic region 32 and the preview moving images, and it is possible to further improve expressiveness.

Additionally, in the embodiment described above, the case is described where the panel images of the moving images, which are selected as candidates by the user via the operation of the operation input section 14, are displayed in the candidate display region 31g. The embodiment is not limited to this. For example, when selecting the base moving images, the moving image data folder, where the base moving image data is stored, is read out, and out of the moving images, the panel images of 3 of the moving images may be displayed in the candidate display region 31g. In addition, the moving image data, which is stored in a predetermined memory location (folder or the like) in the memory section 16 in advance, is read out, and out of the moving images, the panel images of 3 of the moving images may be displayed in the candidate display region 31g.

Additionally, in the embodiment described above, in a case where the cursor CS is moved onto the comic panel MFM arranged in the comic region 32, the section of interest FA corresponding to the comic panel MFM may be reproduced at the position of the comic panel MFM.

Figure 18A:
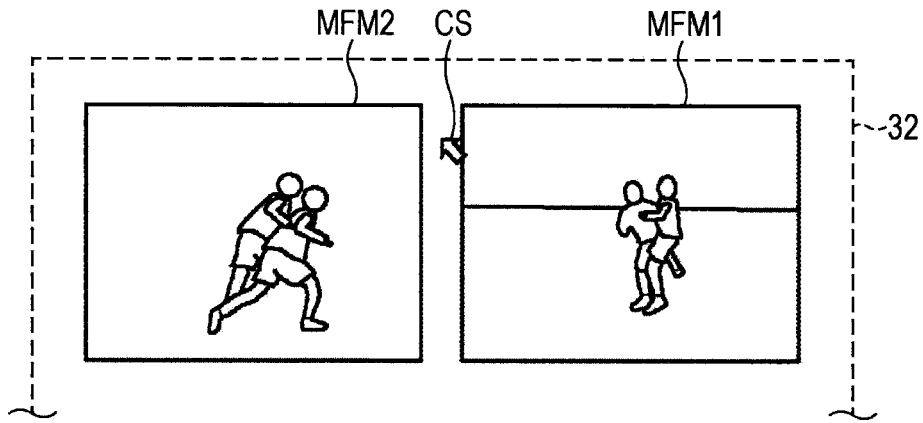
FIGS. 18A to 18C are approximate diagrams illustrating examples of moving comic panels.
Figure 18B:
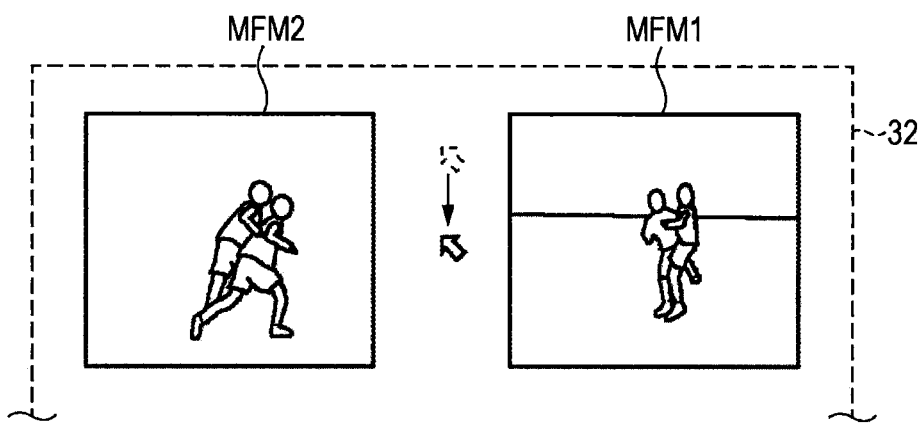
Figure 18C:
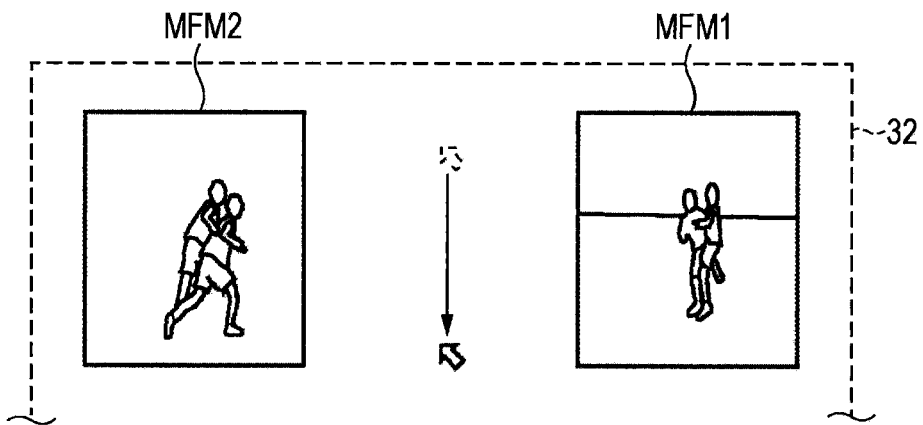

Additionally, in the embodiment described above, the case is described where the comic panels MFM arranged in the comic region 32 are moved according to the operation of the operation input section 14. The embodiment is not limited to this. For example, as shown in FIG. 18, in a state where the cursor CS is positioned between the comic panels MFM1 and MFM2 which are adjacent to the left and right of each other, for example, a drag operation is performed in a downward direction after the mouse is press operated. At this time, between the comic panels MFM1 and MFM2 may be opened out according to the distance of the drag operation.

Additionally, in the embodiment described above, the case is described where the reading order continues in order from the right end of the top row to the left end and is continued next in order from the right end to the left end of the row one below that row. The embodiment is not limited to this, and for example, the reading order may continue in order from the left end of the top row to the right end and may continued next in order from the left end to the right end of the row one below that row.

Additionally, in the embodiment described above, the case is described where the CPU 11 performs each of the processes described above in accordance with a program stored in the ROM 12 or the memory section 16. The embodiment is not limited to this and each of the processes described above may be performed in accordance with a program installed from a memory medium or downloaded from the internet. In addition, each of the processes described above may be performed in accordance with a program installed using other various routes.

Additionally, in the embodiment described above, the case is described where the display control section 21 is provided as the display control section and the reproduction form determining section 23 is provided as the determining section. The embodiment is not limited to this, and the display control section and the determining section with other various configurations may be provided.

The present application contains subject matter related to that disclosed in Japanese Priority Patent Application JP 2010-087140 filed in the Japan Patent Office on Apr. 5, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented image processing method, the method comprising:
    selecting, using a processor, panel images from base moving images;
    displaying an arrangement of the panel images selected from the base moving images in a first window of a display, wherein the selection of the panel images and the arrangement of the panel images in the first window is determined by a user;
    determining a reproduction speed and a reproduction direction for displaying the base moving images in a second window of the display according to the arrangement of the panel images in the first window; and
    determining a first reproduction speed corresponding to a first section of the base moving images comprising a panel image from the panel images, wherein determining the first reproduction speed comprises:
        determining a panel size of the panel image;
        determining a first weight based on a ratio of the panel size of the panel image and a standard panel size; and
        determining the first reproduction speed based on an inverse of the first weight.

2. The computer-implemented image processing method according to claim 1, wherein determining the reproduction direction comprises:
    determining the reproduction direction of the base moving images according to a reading order of the panel images arranged in the first window, wherein the reading order is determined according to position and size of the panel images arranged in the first window.

3. The computer-implemented image processing method according to claim 1, wherein determining the reproduction speed comprises:
    determining a second reproduction speed corresponding to a second section of the base moving images, wherein the second section does not comprise the panel images displayed in the first window.

4. The computer-implemented image processing method according to claim 3, wherein the second reproduction speed is higher than the first reproduction speed.

5. The computer-implemented image processing method according to claim 1, wherein the first reproduction speed varies in inverse relationship to the panel size of the panel images arranged in the first window.

6. The computer-implemented image processing method according to claim 1, wherein
    the panel images comprise a first panel image and a second panel image arranged adjacent to each other, wherein the second panel image appears before the first panel image in the base moving images,
    wherein the reproduction direction is determined such that the base moving images is reproduced in a reverse direction in the second window.

7. The computer-implemented image processing method according to claim 1, further comprising:
    printing the arrangement of the panel images in the first window as a comic strip.

8. The computer-implemented image processing method according to claim 1, further comprising:
    positioning the panel image of the panel images at an arbitrary location in the first window; and
    modifying the panel size of the panel image.

9. The computer-implemented image processing method according to claim 8, further comprising:
    adding a speech bubble to the panel image; and
    adding an image effect to the panel image.

10. The computer-implemented image processing method according to claim 1, further comprising
    determining a second reproduction speed corresponding to a second section of the base moving images not comprising the panel images, wherein determining the second reproduction speed comprises:
        dividing the second section into a plurality of sub-sections;
        determining a first time at which a first panel image of the panel images appears before the second section of the base moving images;
        determining a second time at which a second panel image in at least one of the plurality of sub-sections appears in the base moving images;
        assigning a second weight to the at least one of the plurality of sub-sections associated with the second panel image based on a time difference between the second time and the first time; and
        determining the second reproduction speed based on an inverse of the second weight.

11. An image processing device comprising:
    a processor configured to:
        control a display device to display an arrangement of panel images selected from base moving images in a first window of the display device, wherein the selection of the panel images and the arrangement of the panel images in the first window is determined by a user;

determine a reproduction speed and a reproduction direction for displaying the base moving images in a second window of the display device according to the arrangement of the panel images in the first window;

determine a first reproduction speed corresponding to a first section of the base moving images, wherein the first section comprises a panel image from the panel images; and determine a second reproduction speed corresponding to a second section of the base moving images, wherein the second section does not comprise the panel images displayed in the first window, wherein the second reproduction speed is different from the first reproduction speed.

12. The image processing device according to claim 1, wherein the processor is configured to determine the reproduction speed of the base moving images according to panel size of the panel images arranged in the first window.

13. The image processing device according to claim 1, wherein the processor is configured to determine the reproduction direction of the base moving images according to a reading order of the panel images arranged in the first window, wherein the reading order is determined according to position and size of the panel images arranged in the first window.

14. The image processing device according to claim 1, wherein the reproduction speed of the base moving images varies in inverse relationship to size of the panel images arranged in the first window.

15. The image processing device according to claim 1, wherein the panel images comprise a first panel image and a second panel image arranged adjacent to each other, wherein the second panel image appears before the first panel image in the base moving images, wherein the processor is configured to determine the reproduction direction such that the base moving images are reproduced in a reverse direction in the second window.

16. The image processing device according to claim 1, wherein the processor is configured to control to print out the arrangement of the panel images in the first window as a comic strip.

17. A non-transitory computer-readable storage medium storing a program comprising program code, which when executed by a processor, causes a computer to execute the steps comprising:

displaying an arrangement of panel images selected from base moving images in a first window of a display, wherein the selection of the panel images and the arrangement of the panel images in the first window is determined by a user;

determining a reproduction speed and a reproduction direction for displaying the base moving images in a second window of the display according to the arrangement of the panel images in the first window;

determining a panel size of a panel image of the panel images displayed in the first window;

determining a weight based on a ratio of the panel size of the panel image and a standard panel size; and determining a first reproduction speed corresponding to a first section of the base moving images based on an inverse of the weight, wherein the first section comprises the panel image.

18. An image processing device comprising:

a processor configured to:

display an arrangement of panel images selected from base moving images in a first window of a display device;

determine a reproduction speed and a reproduction direction for displaying the base moving images in a second window of the display device according to the arrangement of the panel images in the first window;

determine a panel size of a panel image of the panel images displayed in the first window;

determine a weight based on a ratio of the panel size of the panel image and a standard size; and determine a first reproduction speed corresponding to a first section of the base moving images based on an inverse of the weight, wherein the first section comprises the panel image.

* * * * *